United States Patent Office 3,311,623
Patented Mar. 28, 1967

3,311,623
NOVEL 4H-m-DITHIINO[5,4-d]PYRIMIDINES
Gerhard Ohnacker and Eberhard Woitun, Biberach an der Riss, Germany, assignors to Boehringer Ingelheim G.m.b.H., Ingelheim am Rhine, Germany, a corporation of Germany
No Drawing. Filed Dec. 11, 1964, Ser. No. 417,782
Claims priority, application Germany, Dec. 16, 1963, T 25,269
13 Claims. (Cl. 260—246)

This invention relates to novel 4H-m-dithiino-[5,4-d]pyrimidine substitution products and acid addition salts thereof, as well as to various methods of preparing such compounds.

More particularly, the present invention relates to 4H-m-dithiino[5,4-d]pyrimidine substitution products of the formula

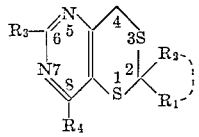

(I)

wherein $R_1$ and $R_2$, which may be identical to or different from each other, are hydrogen, alkyl, haloalkyl, hydroxyalkyl, aminoalkyl, alkenyl, aryl or aralkyl, where the aromatic moiety of said aryl and aralkyl may have one or more halogen, lower alkyl, lower alkoxy, amino, monoalkylamino or dialkylamino substituents attached thereto, or, together with each other and the carbon atom of the dithiino ring to which they are attached, form a 5- to 7-membered spyrocyclic ring which may be interrupted by a sulfur or nitrogen atom, $R_3$ is hydrogen, alkyl, aryl, aralkyl, where the aromatic moiety of said aryl and aralkyl may have one or more halogen, lower alkyl, lower alkoxy, amino, monoalkylalkoxy, alkenoxy, alkoxy-alkoxy, monoalkylamino-alkoxy, dialkyl-amino-alkoxy, aralkoxy, alkylmercapto, carbalkoxyalkyl-mercapto, monoalkylaminoalkyl-mercapto, dialkylaminoalkyl-mercapto, aryl-mercapto, aralkyl-mercapto or an amino group of the formula

where $R_5$ is hydrogen, amino, alkyl, hydroxyalkyl, alkoxyalkyl, alkylthioalkyl, haloalkyl, aminoalkyl, monoalkylaminoalkyl, dialkylaminoalkyl, alkenyl, cycloalkyl, aralkyl, aryl or pyridyl, and $R_6$ is alkyl, alkenyl or hydroxyalkyl, or $R_5$ and $R_6$, together with each other and the adjacent nitrogen atom, form a basic heterocyclic ring which may comprise an additional heteroatom, such as oxygen, sulfur or nitrogen, and may have one or more alkyl or aryl substituents attached to the ring members, and $R_4$ is hydrogen, hydroxy, alkoxy, alkenoxy, alkoxy-alkoxy, monoalkylamino - alkoxy, dialkylamino - alkoxy, aralkoxy, mercapto, alkylmercapto, carbalkoxyalkyl-mercapto, monoalkylaminoalkyl - mercapto, dialkylaminoalkyl-mercapto, arylmercapto, aralkyl-mercapto, amino or

where $R_5$ and $R_6$ have the meanings defined above, and non-toxic, pharmacologically acceptable acid addition salts thereof.

The compounds of the present invention may be prepared by a variety of methods involving well-known chemical principles. However, the following have proved to be most convenient and efficient:

METHOD A

By reacting an m-dithian of the formula

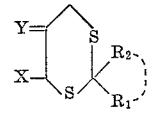

(II)

with a compound of the formula

(III)

or a tautomer thereof of the formula

(IV)

In Formulas II through IV, $R_1$, $R_2$ and $R_3$ have the same meanings as in Formula I, X is a reactive, functional derivative of a carboxyl group, and Y and Z are oxygen or imino (=NH), provided, however, that Y and Z are not oxygen at the same time.

Examples of suitable reactive, functional derivatives of 5-oxo- or 5-imino-m-dithian carboxylic acid are their esters, nitriles, amidines, amides or thioamides.

Examples of suitable compounds of the Formula III or IV are O-alkyl-isoureas, S-alkyl-isothioureas, carboxylic acid amides and carboxylic acid amidines, such as formamide and formamidine, and substituted guanidines This method produces compounds of the Formula I wherein $R_1$, $R_2$ and $R_3$ have the indicated meanings, and $R_4$ is a free hydroxyl group, a free mercapto group or a free amino group. For instance, compounds of the Formula I wherein $R_4$ is a free hydroxyl group are obtained when a compound of the Formula II is used wherein X is alkoxycarbonyl or aminocarbonyl; on the other hand, compounds of the Formula I wherein $R_4$ is a free mercapto group are obtained by starting with a compound of the Formula II wherein X is aminothiocarbonyl; finally, compounds of the Formula I wherein $R_4$ is a free amino group are obtained by starting with a compound of the Formula II wherein X is cyano or amidino.

The reaction between compounds II and III or IV is advantageously performed at temperatures between 20 and 200° C., preferably at a pH of 8–10, using equimolar amounts of the reactants, and in the presence of a solvent, such as water or ethanol. The selection of the reaction temperature depends largely upon the reactivity of the reactant of the Formula III or IV. Thus, while the reaction with an amidine, guanidine, O-alkyl-isourea or S-alkyl-isothiourea will proceed already at room temperature, the reaction mixture must be heated to as high as 100–200° C. in the case that the reactant is formamide, depending upon the reactivity of the functional derivative of the carboxylic acid of the Formula II.

The majority of m-dithian derivatives of the Formula II used as starting compounds in this method are known compounds and are described by Howard and Lindsey, J.A.C.S. 83, 158–164 (1960) and by Lüttringhaus and Prinzbach, Liebigs Ann. Chem. 624, 79–97 (1957). However, those which have heretofore not been specifically described may be prepared by the methods described in the above literature references. Thus, for instance, we were able to prepare the two novel compounds 2-methyl-2-benzyl-4-carbethoxy-m-dithianone-(5), which is a non-distillable oil, and 2-benzyl-4-carbethoxy-m-dithianone-(5), which has a melting point of 72° C.

METHOD B

By reacting a 4H-m-dithiino[5,4-d]pyrimidine of the formula

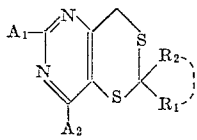
(V)

wherein $R_1$ and $R_2$ have the same meanings as in Formula I, and one of substituents $A_1$ and $A_2$ is halogen, mercapto or lower alkyl-mercapto and the other is hydrogen, halogen, alkyl, aryl, aralkyl, where the aromatic mixture of said aryl and aralkyl may have one or more halogen, lower alkyl, lower alkoxy, amino, monoalkylamino or dialkylamino substituents attached thereto, alkoxy, alkenoxy, alkoxy-alkoxy, monoalkylamino-alkoxy, dialkylamino-alkoxy, aralkoxy, mercapto, alkylmercapto, carbalkoxyalkyl - mercapto, monoalkylaminoalkyl - mercapto, dialkylaminoalkyl-mercapto, aryl-mercapto, aralkylmercapto or

where $R_5$ and $R_6$ have the same meanings as in Formula I, with a compound of the formula $R_7H$          $R_8H$
(VI)    or    (VII)

wherein $R_7$ is alkoxy, alkenoxy, alkoxy-alkoxy, monoalkylamino-alkoxy, dialkylamino-alkoxy, aralkoxy, alkylmercapto, carbalkoxyalkyl-mercapto, monoalkylamino-alkyl-mercapto, dialkylaminoalkyl-mercapto, arylmercapto, aralkylmercapto, amino or

where $R_5$ and $R_6$ have the same meanings as in Formula I, and $R_8$ is alkoxy, alkenoxy, alkoxy-alkoxy, monoalkylamino-alkoxy, dialkylamino-alkoxy, aralkoxy, alkylmercapto, carbalkoxyalkyl-mercapto, monoalkylaminoalkyl-mercapto, dialkylaminoalkyl - mercapto, arylmercapto, aralkylmercapto, amino or

where $R_5$ and $R_6$ have the same meanings as in Formula I.

Thus, if it is desired to use the present method for the preparation of a compound of the Formula I wherein $R_3$ and $R_4$ are identical, the starting compound should be one of the Formula V wherein both $A_1$ and $A_2$ are halogen, mercapto or alkylmercapto; such a starting compound is then reacted with two or more molar equivalents of compound VI or VII.

On the other hand, if it is desired to use the present method for the preparation of a compound of the Formula I wherein $R_3$ and $R_4$ are different substituents, the substituent $A_2$ may either first be exchanged for a radical $R_8$ and substituent $A_1$ is thereafter exchanged for a radical $R_7$, or a starting compound of the Formula V may be used wherein $A_1$ or $A_2$ is already a radical other than halogen, mercapto or alkylmercapto, which is reacted with one or more molar equivalents of a compound of the Formula VI or VII.

The reaction is advantageously carried out in the presence of an inert organic solvent at a temperature between 0 and 200° C. In the event that either or both of substituents $A_1$ and $A_2$ in compound V are halogen, the presence of an agent capable of tying up or neutralizing the hydrogen halide released by the reaction is required. Suitable such agents are inorganic or tertiary organic bases. In those instances where either or both of radicals $R_7$ and $R_8$ in compounds VI and VII are of the formula

as previously defined, an excess of at least one molar equivalent of compound VI or VII above and beyond the amount required for reaction with compound V may be used as the hydrogen halide—neutralizing agent. A still greater excess of the amine

may also serve as the solvent medium for the reaction.

The optimum reaction temperature for the reaction pursuant to the present method depends largely upon the reactivity of the reactants. In general, if either or both of $A_1$ and $A_2$ are halogen, the exchange of these halogen atoms for a radical $R_7$ or $R_8$ in the presence of a hydrogen halide—neutralizing agent proceeds at room temperature or moderately elevated temperatures. On the other hand, if either or both of $A_1$ and $A_2$ are mercapto or alkylmercapto, the exchange of these mercapto groups for the amino group

as previously defined, proceeds only at temperatures between 100 and 200° C.

In the event that the solvent medium selected for the reaction has a low boiling point, or if an excess of the compound $R_7H$ or $R_8H$, respectively, is used as solvent medium, as described above, and this compound has a low boiling point, it is advantageous to perform the reaction in a closed vessel.

If it is desired to prepare a compound of the Formula I wherein $R_3$ is a substituted hydroxyl or substituted mercapto group and/or $R_4$ is a free or substituted hydroxyl group or a free or substituted mercapto group, it is advantageous to start with a compound of the Formula V wherein either or both of the substituents $A_1$ and $A_2$ are halogen. On the other hand, if it is desired to prepare a compound of the Formula I wherein $R_3$ is alkyl, aryl or aralkyl, it is necessary to start with a compound of the Formula V wherein $A_1$ is already alkyl, aryl or aralkyl.

The compounds of the Formula V used as starting materials in Method B may be prepared by Method A, supra. If it is desired to prepare compounds of the Formula V wherein either or both of substituents $A_1$ and $A_2$ are mercapto or alkylmercapto, they may be prepared directly by ring closure pursuant to Method A, for instance, by reacting a 5-imino-m-dithian-4-carboxylic acid thioamide with a corresponding thiourea derivative.

Compounds of the Formula V wherein $A_1$ and $A_2$ are halogen may be prepared from 6,8-dihydroxy-4H-m-dithiino[5,4-d]pyrimidine, which is described in Ann. Chem. 49, 1844–1849 (1959), by reacting the latter with a phosphorus oxyhalide.

Compounds of the Formula V wherein only $A_2$ is halogen may be obtained by reacting a compound of the Formula I wherein $R_4$ is hydroxy with a phosphorus oxyhalide.

Examples A through X below illustrate the preparation of a number of compounds of the Formula V which may be used as starting compounds for Method B.

In those instances where Methods A and B yield a compound of the Formula I wherein either or both of substituents $R_3$ and $R_4$ are hydroxyl, mercapto or amino, which is always the case for $R_4$ when the procedure of Method A is used, that compound may subsequently be transformed by customary methods into a corresponding compound wherein either or both of substituents $R_3$ and $R_4$ are any of the substituted hydroxyl, mercapto or amino groups included in the definition of $R_3$ and $R_4$ in connection with Formula I, for instance, by reacting the intermediate product with a reactive ester of a corresponding alcohol, especially with hydrohalic acid esters or sulfonic acid esters. It should be noted, however, that aryl and pyridyl radicals may not be introduced by this method.

In those cases where Method A or B yields a compound of the Formula I wherein either or both of substituents $R_3$ and $R_4$ are mercapto or substituted mercapto, these substituents may subsequently be converted into hydrogen by known methods, such as by hydrogenation in the presence of Raney nickel. As a matter of fact, compounds of the Formula I wherein $R_4$ is hydrogen can be obtained only by this subsequent hydrogenation procedure.

Compounds of the Formula I which have one or more basic substituents attached to the fused-ring nucleus may, if desired, be converted into their non-toxic, pharmacologically acceptable acid addition salts by known methods, such as by dissolving the free base in a suitable solvent and acidifying the solution with one or more molar equivalents of the desired inorganic or organic acid. Examples of such acid addition salts are those formed with hydrochloric acid, sulfuric acid, phosphoric acid, acetic acid, critic acid, tartaric acid, maleic acid, 8-chlorotheophylline and the like.

In addition, those compounds of the Formula I wherein $R_4$ is a free hydroxyl or mercapto group may be converted into their alkali metal salts by customary methods.

The following examples further illustrate the present invention and will enable others skilled in the art to understand it more completely. It should be understood, however, that the invention is not limited to the particular illustrative examples given below.

*Example A*

*Preparation of 6-chloro-8-morpholino-4H-m-dithiino[5,4-d]pyrimidine.*—0.8 cc. (0.0092 mol) of morpholine was added dropwise at room temperature to a vigorously agitated suspension of 1 gm. (0.0043 mol) of 6,8-dichloro-4H-m-dithiino [5,4-d]pyrimidine in 10 cc. of absolute ethanol. A slight increase in temperature was observed, but dissolution of the suspended particles did not occur. After all of the morpholine had been added the reaction mixture was stirred at room temperature for one and a half hours more. Thereafter, the reaction mixture was vacuum filtered, and the filter cake was washed first with ethanol and water and was then recrystallized from ethanol. 0.7 gm. (58% of theory) of a crystalline compound having a melting point of 181–182° C. was obtained. It was identified to be 6-chloro-8-morpholino-4H-m-dithiino[5,4-d]pyrimidine of the formula

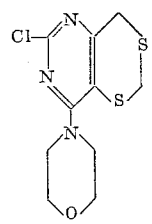

*Analysis.*—$C_{10}H_{12}ClN_3OS_2$; mol. wt. 289.82. Calculated: C, 41.44%; H, 4.17%; Cl, 12.24%. Found: C, 41.30%; H, 4.20%; Cl, 12.48%.

*Example B*

*Preparation of 6-morpholino-8-chloro-4H-m-dithiino[5,4-d]pyrimidine.*—A mixture of 6.75 gm. (0.025 mol) of 6-morpholino-8-hydroxy-4H-m-dithiino[5,4-d]pyrimidine and 30 cc. of phosphorus oxychloride was refluxed for two hours. A clear solution was formed. The excess, unreacted phosphorus oxychloride was distilled off in vacuo, and the viscous residue was decomposed with ice water and extracted several times with chloroform. The chloroform extract solutions were combined, the chloroform was evaporated in vacuo, and the yellowish-brown crystalline residue was recrystallized from ethanol. 6.0 gm. (83% of theory) of a product having a melting point of 129–131° C. were obtained, which was identified to be 6-morpholino-8-chloro-4H-m-dithiino[5,4-d]pyrimidine of the formula

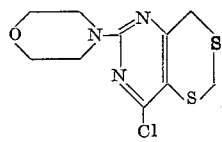

*Analysis.*—$C_{10}H_{12}ClN_3OS_2$; mol. wt. 289.82. Calculated: C, 41.44%; H, 4.17%; Cl, 12.24%. Found: C, 41.40%; H, 4.09%; Cl, 12.31%.

Using a procedure analogous to that described in Example B, the following additional 8-chloro-4H-m-dithiino[5,4-d]pyrimidines of the Formula V above were prepared with the aid of phosphorus oxychloride:

*Example C*

6-(2'-methylmorpholino-8-chloro-4H-m-dithiino[5,4-d]pyrimidine, M.P. 93–94° C. (recrystallized from ethanol), from 6-(2'-methylmorpholino)-8-hydroxy-4H-m-dithiino[5,4-d]pyrmidine. The yield was 74% of theory.

*Example D*

6-pyrrolidino-8-chloro-4H-m-dithiino[5,4-d]pyrimidine, M.P. 90–91° C. (recrystallized from gasoline), from 6-pyrrolidino-8-hydroxy-4H-m-dithiino[5,4-d]pyrimidine. The yield was 77% of theory.

*Example E*

6-methyl-8-chloro-4H-m-dithiino[5,4-d]pyrimidine, a non-distillable oil, from 6-methyl-8-hydroxy-4H-m-dithiino[5,4-d]pyrimidine. The yield was 74% of theory.

*Example F*

6-n-propyl-8-chloro-4H-m-dithiino[5,4-d]pyrimidine, a non-distillable oil, from 6-n-propyl-8-hydroxy-4H-m-dithiino[5,4-d]pyrimidine. The yield was 64% of theory.

*Example G*

6-isopropyl-8-chloro-4H-m-dithiino[5,4-d]pyrimidine, a non-distillable oil, for 6-isopropyl-8-hydroxy-4H-m-dithiino[5,4-d]pyrimidine. The yield was 90% of theory.

*Example H*

6-n-pentyl-8-chloro-4H-m-dithiino[5,4-d]pyrimidine, a non-distillable oil, from 6-n-pentyl-8-hydroxy-4H-m-dithiino[5,4-d]pyrimidine. The yield was 90% of theory.

*Example I*

6-phenyl-8-chloro-4H-m-dithiino[5,4-d]pyrimidine, a non-distillable oil, from 6-phenyl-8-hydroxy-4H-m-dithiino[5,4-d]pyrimidine. The yield was 79% of theory.

*Example J*

2-methyl-6-pyrrolidino-8-chloro-4H-m-dithiino[5,4-d]pyrimidine, a non-distillable oil of the formula

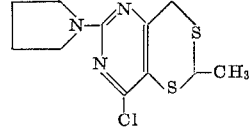

from 2-methyl - 6-pyrrolidino - 8-hydroxy-4H-m-dithiino [5,4-d]pyrimidine. The yield was 84% of theory.

*Example K*

2-methyl - 6-morpholino - 8-chloro - 4H-m-dithiino[5,4-d]pyrimidine, M.P. 140° C. (recrystallized from ethylacetate), from 2-methyl-6-morpholino - 8-hydroxy-4H-m-dithiino[5,4-d]pyrimidine. The yield was 71% of theory.

*Example L*

2,6-dimethyl - 8-chloro - 4H-m-dithiino[5,4-d]pyrimidine, a non-distillable oil, from 2,6-dimethyl-8-hydroxy-4H-m-dithiino[5,4-d]pyrimidine. The yield was 82% of theory.

*Example M*

2-methyl - 6-ethyl - 8-chloro - 4H-m-dithiino[5,4-d]pyrimidine, a non-distillable oil, from 2-methyl-6-ethyl-8-hydroxy-4H-m-dithiino[5,4-d]pyrimidine. The yield was 84% of theory.

*Example N*

2 - methyl-6-n-propyl - 8 - chloro-4H-m-dithiino[5,4-d]pyrimidine, a non-distillable oil, from 2-methyl-6-n-propyl-8-hydroxy - 4H-m-dithiino[5,4-d]pyrimidine. The yield was 81% of theory.

*Example O*

2-phenyl - 6-pyrrolidino - 8-chloro-4H-m-dithiino[5,4-d]pyrimidine, a non-distillable oil of the formula

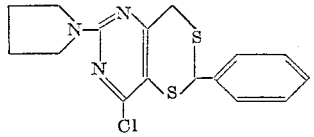

from 2-phenyl-6-pyrrolidino - 8-hydroxy - 4H-m-dithiino [5,4-d]pyrimidine. The yield was 90% of theory.

*Example P*

2-phenyl - 6-morpholino - 8-chloro - 4H-m-dithiino[5,4-d]pyrimidine, M.P. 147–148° C. (recrystallized from ethylacetate), from 2-phenyl-6-morpholino-8-hydroxy-4H-m-dithiino[5,4-d]pyrimidine. The yield was 57% of theory.

*Example Q*

2-phenyl - 6 - methyl - 8 - chloro-4H-m-dithiino[5,4-d] pyrimidine, a non-distillable oil, from 2-phenyl-6-methyl-8-hydroxy - 4H-m-dithiino[5,4-d]pyrimidine. The yield was 60% of theory.

*Example R*

2-phenyl-6-n-propyl-8-chloro-4H - m - dithiino[5,4 - d] pyrimidine, a non-distillable oil, from 2-phenyl-6-propyl-8-hydroxy-4H - m - dithiino[5,4-d]pyrimidine. The yield was 80% of theory.

*Example S*

6-ethyl-8-chloro - 4H - m - dithiino[5,4-d]pyrimidine, a non-distillable oil, from 6-ethyl-8-hydroxy-4H-m-dithiino [5,4-d]pyrimidine. The yield was 83% of theory.

*Example T*

6-benzyl-8-chloro-4H - m - dithiino[5,4 - d]pyrimidine, M.P. 136–137° C. (recrystallized from ethylacetate), of the formula

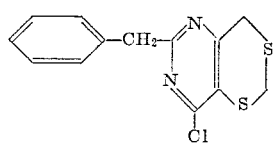

from 6 - benzyl - 8-hydroxy-4H-m-dithiino[5,4-d]pyrimidine. The yield was 78% of theory.

*Example U*

2-phenyl-6-ethyl-8-chloro-4H-m-dithiino[5,4 - d]pyrimidine, a non-distillable oil, from 2-phenyl-6-ethyl-8-hydroxy-4H-m-dithiino[5,4-d]pyrimidine. The yield was 60% of theory.

*Example V*

2-phenyl-6-isopropyl-8-chloro-4H - m - dithiino[5,4-d] pyrimidine, a non-distillable oil, from 2-phenyl-6-isopropyl-8-hydroxy-4H - m - dithiino[5,4-d]pyrimidine. The yield was 92% of theory.

*Example W*

6,8-dichloro-4H - m - dithiino[5,4-d]pyrimidine, M.P. 121–122.5° C. (recrystallized from petroleum ether), of the formula

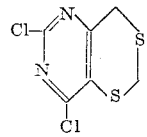

from 6,8 - dihydroxy - 4H - m-dithiino[5,4-d]pyrimidine. The yield was 48% of theory.

*Example X*

6-ethylmercapto-8-chloro-4H-m-dithiino[5,4 - d]pyrimidine, M.P. 81–82° C. (recrystallized from ethanol), of the formula

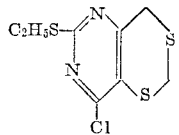

from 6-ethylmercapto-8-hydroxy-4H-m-dithiino[5,4 - d] pyrimidine. The yield was 78% of theory.

*Example 1*

Preparation of 6-ethylmercapto-8-hydroxy-4H-m-dithiino[5,4-d]pyrimidine by Method A.—20.6 gm. (0.1 mol) of 4-carbethoxy-5-m-dithianone were added dropwise at room temperature to an agitated solution of 18.5 gm. (0.1 mol) of S-ethylisothiourea hydrobromide and 13.8 gm. (0.1 mol) of potassium carbonate in 100 cc. of water. The reaction product began to precipitate after a short period of time. After all of the dithianone had been added, the reaction mixture was stirred at room temperature for eight hours more. Thereafter, the reaction mixture was vacuum filtered, and the filter cake was washed with water and was then recrystallized from ethanol. 22.5 gm. (91% of theory) of a white crystalline compound having a melting point of 226–227° C. were obtained, which was identified to be the compound of the formula

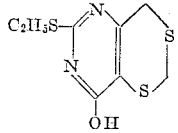

Analysis.—$C_8H_{10}N_2OS_3$: mol. wt. 246.38. Calculated: C, 39.00%; H, 4.09%; N, 11.37%; S, 39.04%. Found: C, 38.90%; H, 4.14%; N, 11.23%; S, 38.98%.

*Example 2*

Preparation of 6-methoxy - 8 - hydroxy-4H-m-dithiino [5,4-d]pyrimidine by Method A.—11.6 gm. (0.105 mol) of O-methylisourea hydrochloride were added, while stirring, to a solution of 2.4 gm. (0.105 gm.-atoms) of sodium in 75 cc. of absolute ethanol which had been cooled to +10° C. The mixture was allowed to stand for 15 minutes, and then 145 gm. (0.07 mol) of 4-carbethoxy-m-dithianone-(5) were added dropwise at 10° C., whereby a heavy precipitate was formed immediately. In order to bring the reaction to completion, the reaction mixture was then stirred for 15 hours at room temperature. Thereafter, the precipitate was separated by vacuum filtration, washed with water and recrystallized from a mixture of butanol and dimethylformamide. 6.5 gm. (43% of theory) of a substance having a melting point of 239–240° C. were obtained. It was identified to be the compound of the formula

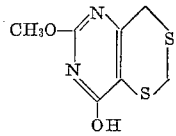

*Analysis.*—$C_7H_8N_2O_2S_2$: mol. wt. 216.29. Calculated: C, 38.87%; H, 3.73%; N, 12.95%. Found: C, 38.93%; H, 3.83%; N, 12.75%.

Example 3

*Preparation of 6-pyrrolidino-8-hydroxy-4H-m-dithiino-[5,4-d]pyrimidine by Method A.*—15.0 gm. (0.1 mol) of N,N-tetramethylene-guanidine hydrochloride and 20.6 gm. (0.1 mol) of 4-carbethoxy-5-m-dithianone were added to a solution of 2.3 gm. (0.1 gm.-atoms) of sodium in 50 cc. of absolute ethanol. The resulting mixture was then stirred for half an hour at room temperature and subsequently for five hours at reflux temperature. Thereafter, the reaction mixture was allowed to cool, and the precipitate formed thereby was separated by vacuum filtration, washed with water and recrystallized from dimethylformamide. 18.1 gm. (71% of theory) of a substance having a melting point of 286–287° C. were obtained. It was identified to be the compound of the formula

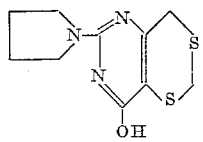

*Analysis.*—$C_{10}H_{13}N_3OS_2$; mol. wt. 255.37. Calculated: C, 47.03%; H, 5.13%; N, 16.46%. Found: C, 47.17%; H, 5.12%; N, 16.42%.

Example 4

Using a procedure analogous to that described in Example 1, 2-methyl-6-ethylmercapto-8-hydroxy-4H-m-dithiino[5,4-d]pyrimidine, M.P. 189–190° C. (recrystallized from dimethylformamide), of the formula

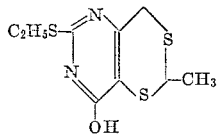

was prepared from S-ethylisothiourea hydrobromide and 2-methyl-4-carbethoxy-m-dithianone-(5). The yield was 69% of theory.

Example 5

Using a procedure analogous to that described in Example 1, 2-phenyl-6-ethylmercapto-8-hydroxy-4H-m-dithiino[5,4-d]pyrimidine, M.P. 260–262° C. (recrystallized from ethyl glycol), of the formula

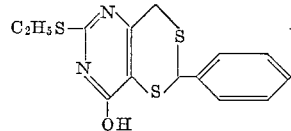

was prepared from S-ethylisothiourea hydrobromide and 2-phenyl-4-carbethoxy-m-dithianone-(5). The yield was 73% of theory.

Example 6

Using a procedure analogous to that described in Example 2, 2-methyl-6-methoxy-8-hydroxy-4H-m-dithiino[5,4-d]pyrimidine, M.P. 229–230° C. (recrystallized from butanol), of the formula

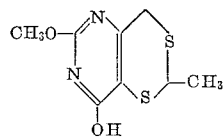

was prepared from O-methylisourea hydrochloride and 2-methyl-4-carbethoxy-m-dithianone-(5). The yield was 45% of theory.

Example 7

Using a procedure analogous to that described in Example 2, 2-phenyl-6-methoxy-8-hydroxy-4H-m-dithiino-[5,4-d]pyrimidine, M.P. 252–253° C. (recrystallized from a mixture of dimethylformamide and ethylglycol), was prepared from O-methylisourea hydrochloride and 2-phenyl-4-carbethoxy-m-dithianone-(5). The yield was 58% of theory.

Example 8

Using a procedure analogous to that described in Example 2, 8-hydroxy-4H-m-dithiino[5,4-d]pyrimidine, M.P. 245–247° C. (recrystallized from butanol), of the formula

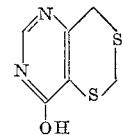

was prepared from formamidine hydrochloride and 4-carbethoxy-m-dithianone-(5). The yield was 64% of theory.

Example 9

Using a procedure analogous to that described in Example 2, 6-methyl-8-hydroxy-4H-m-dithiino[5,4-d]pyrimidine, M.P. 281–283° C. (recrystallized from dimethylformamide), of the formula

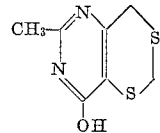

was prepared from acetamidine hydrochloride and 4-carbethoxy-m-dithianone-(5). The yield was 59% of theory.

Example 10

Using a procedure analogous to that described in Example 2, 6-ethyl-8-hydroxy-4H-m-dithiino[5,4-d]pyrimidine, M.P. 270–272° C. (recrystallized from butanol), was prepared from propionamidine hydrochloride and 4-carbethoxy-m-dithianone-(5). The yield was 67% of theory.

Example 11

Using a procedure analogous to that described in Example 2, 6-n-propyl-8-hydroxy-4H-m-dithiino[5,4-d]pyrimidine, M.P. 223–227° C. (recrystallized from ethanol), was prepared from n-butyramidine hydrochloride and 4-carbethoxy-m-dithianone-(5). The yield was 75% of theory.

Example 12

Using a procedure analogous to that described in Example 2, 6-isopropyl-8-hydroxy-4H-m-dithiino[5,4-d]pyrimidine, M.P. 269–270° C. (recrystallized from dimethylformamide), was prepared from isobutyramidine hydrochloride and 4-carbethoxy-m-dithianone-(5). The yield was 62% of theory.

Example 13

Using a procedure analogous to that described in Example 2, 6-n-butyl-8-hydroxy-4H-m-dithiino[5,4-d]pyrimidine, M.P. 175–176° C. (recrystallized from methanol), was prepared from n-valeramidine hydrochloride and 4-carbethoxy-m-dithianone-(5). The yield was 53% of theory.

*Example 14*

Using a procedure analogous to that described in Example 2, 2-methyl-8-hydroxy-4H-m-dithiino[5,4-d]pyrimidine, M.P. 214–216° C. (recrystallized from ethanol), of the formula

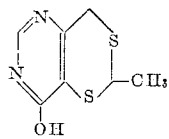

was prepared from formamidine hydrochloride and 2-methyl-4-carbethoxy-m-dithianone-(5). The yield was 70% of theory.

*Example 15*

Using a procedure analogous to that described in Example 2, 2,6-dimethyl-8-hydroxy-4H-m-dithiino[5,4-d]pyrimidine, M.P. 255–257° C. (recrystallized from dimethylformamide), of the formula

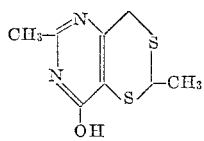

was prepared from acetamidine hydrochloride and 2-methyl-4-carbethoxy-m-dithianone-(5). The yield was 50% of theory.

*Example 16*

Using a procedure analogous to that described in Example 2, 2-methyl-6-ethyl-8-hydroxy-4H-m-dithiino[5,4-d]pyrimidine, M.P. 217–218° C. (recrystallized from propanol), was prepared from propionamidine hydrochloride and 2-methyl-4-carbethoxy-m-dithianone-(5). The yield was 49% of theory.

*Example 17*

Using a procedure analogous to that described in Example 2, 2-methyl-6-n-propyl-8-hydroxy-4H-m-dithiino[5,4-d]pyrimidine, M.P. 203–204° C. (recrystallized from ethanol), was prepared from n-butyramidine hydrochloride and 2-methyl-4-carbethoxy-m-dithianone-(5). The yield was 66% of theory.

*Example 18*

Using a procedure analogous to that described in Example 2, methyl-6-isopropyl-8-hydroxy-4H-m-dithiino[5,4-d]pyrimidine, M.P. 217–219° C. (recrystallized from ethanol), was prepared from isobutyramidine hydrochloride and 2-methyl-4-carbethoxy-m-dithianone-(5). The yield was 58% of theory.

*Example 19*

Using a procedure analogous to that described in Example 2, 2-methyl-6-n-butyl-8-hydroxy-4H-m-dithiino[5,4-d]pyrimidine, M.P. 198–200° C. (recrystallized from acetone), was prepared from n-valeramidine hydrochloride and 2-methyl-4-carbethoxy-m-dithianone-(5). The yield was 73% of theory.

*Example 20*

Using a procedure analogous to that described in Example 2, 2-phenyl-6-methyl-8-hydroxy-4H-m-dithiino[5,4-d]pyrimidine, M.P. 283–285° C. (recrystallized from dimethylformamide), was prepared from acetamidine hydrochloride and 2-phenyl-4-carbethoxy-n-dithianone-(5). The yield was 61% of theory.

*Example 21*

Using a procedure analogous to that described in Example 2, 2-phenyl-6-ethyl-8-hydroxy-4H-m-dithiino[5,4-d]pyrimidine, M.P. 269–270° C. (recrystallized from dimethylformamide), was prepared from propionamidine hydrochloride and 2-phenyl-4-carbethoxy-m-dithianone-(5). The yield was 74% of theory.

*Example 22*

Using a procedure analogous to that described in Example 2, 2-phenyl-6-n-propyl-8-hydroxy-4H-m-dithiino[5,4-d]pyrimidine, M.P. 281–283° C. (recrystallized from ethylglycol), was prepared from n-butyramidine hydrochloride and 2-phenyl-4-carbethoxy-m-dithianone-(5). The yield was 87% of theory.

*Example 23*

Using a procedure analogous to that described in Example 2, 2-phenyl-6-isopropyl-8-hydroxy-4H-m-dithiino[5,4-d]pyrimidine, M.P. 274–276° C. (recrystallized from dimethylformamide), was prepared from isobutyramidine hydrochloride and 2-phenyl-4-carbethoxy-m-dithianone-(5). The yield was 78% of theory.

*Example 24*

Using a procedure analogous to that described in Example 2, 2-phenyl-6-n-butyl-8-hydroxy-4H-m-dithiino[5,4-d]pyrimidine, M.P. 225–227° C. (recrystallized from ethylglycol), was prepared from n-valeramidine hydrochloride and 2-phenyl-4-carbethoxy-m-dithianone-(5). The yield was 75% of theory.

*Example 25*

Using a procedure analogous to that described in Example 2, 6-n-pentyl-8-hydroxy-4H-m-dithiino[5,4-d]pyrimidine, M.P. 177–179° C. (recrystallized from ethanol), was prepared from n-capramidine hydrochloride and 4-carbethoxy-m-dithianone-(5). The yield was 67% of theory.

*Example 26*

Using a procedure analogous to that described in Example 2, 6-n-hexyl-8-hydroxy-4H-m-dithiino[5,4-d]pyrimidine, M.P. 143–144° C. (recrystallized from ethanol), was prepared from n-enanthamidine hydrochloride and 4-carbethoxy-m-dithianone-(5). The yield was 61% of theory.

*Example 27*

Using a procedure analogous to that described in Example 2, 6-phenyl-8-hydroxy-4H-m-dithiino[5,4-d]pyrimidine, M.P. 270° C. (recrystallized from methylglycol), was prepared from benzamidine hydrochloride and 4-carbethoxy-m-dithianone-(5). The yield was 40% of theory.

*Example 28*

Using a procedure analogous to that described in Example 3, 2-methyl-6-pyrrolidino-8-hydroxy-4H-m-dithiino[5,4-d]pyrimidine, M.P. 265–266° C. (recrystallized from methylglycol), of the formula

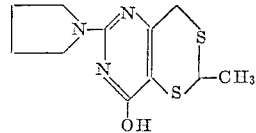

was prepared from N,N-tetramethylene-guanidine hydrochloride and 2-methyl-4-carbethoxy-m-dithianone-(5). The yield was 54% of theory.

*Example 29*

Using a procedure analogous to that described in Example 3, 2-methyl-6-morpholino-8-hydroxy-4H-m-dithiino[5,4-d]pyrimidine, M.P. 268–270° C. (recrystallized from methylglycol), of the formula

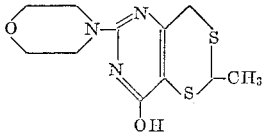

was prepared from N,N-diethyleneoxy-guanidine hydrochloride and 2-methyl-4-carbethoxy-m-dithianone-(5). The yield was 72% of theory.

*Example 30*

Using a procedure analogous to that described in Example 2, 2 - methyl-6-phenyl-8-hydroxy-4H-m-dithiino [5,4-d]pyrimidine, M.P. 269–271° C. (recrystallized from methylglycol), of the formula

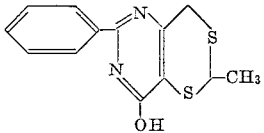

was prepared from benzamidine hydrochloride and 2-methyl-4-carbethoxy-m-dithianone-(5). The yield was 50% of theory.

*Example 31*

Using a procedure analogous to that described in Example 2, 2,6 - diphenyl-8-hydroxy-4H-m-dithiino[5,4-d] pyrimidine, M.P. 276–278° C. (recrystallized from methylglycol), of the formula

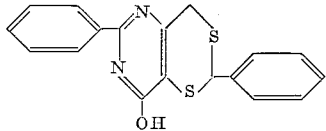

was prepared from benzamidine hydrochloride and 2-phenyl-4-carbethoxy-m-dithianone-(5). The yield was 65% of theory.

*Example 32*

Using a procedure analogous to that described in Example 1, 2,2 - dimethyl-6-ethylmercapto-8-hydroxy-4H-m-dithiino[5,4-d]pyrimidine, M.P. 217–219° C. (recrystallized from ethanol), of the formula

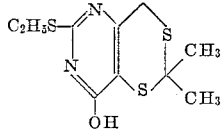

was prepared from S-ethylisothiourea hydrobromide and 2,2-dimethyl-4-carbethoxy-m-dithianone-(5). The yield was 66% of theory.

*Example 33*

Using a procedure analogous to that described in Example 1, 2-methyl - 2 - benzyl-6-ethylmercapto-8-hydroxy-4H-m-dithiino[5,4-d]pyrimidine, M.P. 226–228° C. (recrystallized from methylglycol), of the formula

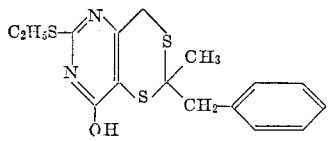

was prepared from S-ethylisothiourea hydrobromide and 2-methyl - 2 - benzyl - 4 - carbethoxy-m-dithianone-(5). The yield was 36% of theory.

*Example 34*

Using a procedure analogous to that described in Example 2, 6-benzyl - 8 - hydroxy-4H-m-dithiino[5,4-d] pyrimidine, M.P. 250–252° C. (recrystallized from methylglycol), of the formula

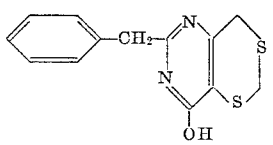

was prepared from phenylacetamidine hydrochloride and 4-carbethoxy-m-dithianone-(5). The yield was 43% of theory.

*Example 35*

Using a procedure analogous to that described in Example 2, 2-methyl - 2 - phenyl-6-benzyl-8-hydroxy-4H-m-dithiino[5,4-d]pyrimidine, M.P. 217–218° C. (recrystallized from ethanol), was prepared from phenylacetamidine hydrochloride and 2-methyl-2-phenyl-4-carbethoxy-m-dithianone-(5). The yield was 56% of theory.

*Example 36*

Using a procedure analogous to that described in Example 2, 2,2-dimethyl-6-n-propyl - 8 - hydroxy-4H-m-dithiino[5,4-d]pyrimidine, M.P. 213–214° C. (recrystallized from ethanol), was prepared from n-butyramidine hydrochloride and 2,2-dimethyl-4-carbethoxy-m-dithianone-(5). The yield was 40% of theory.

*Example 37*

Using a procedure analogous to that described in Example 2, 2-methyl-6-n-hexyl-8-hydroxy-4H-m-dithiino[5,4-d]pyrimidine, M.P. 156–157° C. (recrystallized from ethanol), of the formula

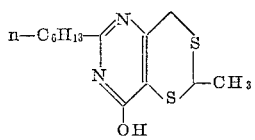

was prepared from enanthamidine hydrochloride and 2-methyl-4-carbethoxy-m-dithianone-(5). The yield was 68% of theory.

*Example 38*

Using a procedure analogous to that described in Example 3, 2-methyl-6-n-hexylamino-8-hydroxy-4H-m-dithiino[5,4-d]pyrimidine, M.P. 174–175° C. (recrystallized from butanone), of the formula

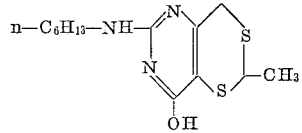

was prepared from N-n-hexyl-guanidine hydrochloride and 2-methyl-4-carbethoxy-m-dithianone-(5). The yield was 54% of theory.

*Example 39*

Using a procedure analogous to that described in Example 2, 2-isopropyl-6-methyl-8-hydroxy-4H-m-dithiino [5,4-d]pyrimidine, M.P. 226–227° C. (recrystallized from ethanol), was prepared from acetamidine hydrochloride and 2 - isopropyl-4-carbethoxy - m - dithianone-(5). The yield was 48% of theory.

*Example 40*

Using a procedure analogous to that described in Example 2, 2-isopropyl-6-n-propyl-8-hydroxy-4H-m-dithiino [5,4d]pyrimidine, M.P. 208–209° C. (recrystallized from ethanol), was prepared from n-butyramidine hydrochloride and 2-isopropyl-4-carbethoxy-m-dithianone-(5). The yield was 56% of theory.

*Example 41*

Using a procedure analogous to that described in Example 2, 2-isopropyl-6-benzyl-8-hydroxy-4H-m-dithiino [5,4d]pyrimidine, M.P. 245–246° C. (recrystallized from methylglycol), was prepared from phenylacetamidine hydrochloride and 2-isopropyl-4-carbethoxy-m-dithianone-(5).

*Example 42*

Using a procedure analogous to that described in Example 2, 6' - methyl-8'-hydroxy-spiro[cyclohexane-1,2'-

(4H-m-dithiino[5,4-d]pyrimidine)], M.P. 270–271° C. (recrystallized from ethanol), of the formula

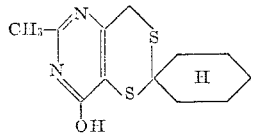

was prepared from acetamidine hydrochloride and spiro-(cyclohexane - 1,2') - 4' - carbethoxy-m-dithianone-(5'). The yield was 39% of theory.

*Example 43*

Using a procedure analogous to that described in Example 1, 6-ethylmercapto-8-hydroxy-spiro[(4H-m-dithiino[5,4-d]pyrimidine)2-3'-tetrahydrothiophene], M.P. 207–209° C. (recrystallized from ethanol), of the formula

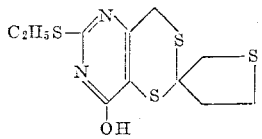

was prepared from S-ethylisothiourea hydrobromide and spiro - (2',3-tetrahydrothiophene)-4'-carbethoxy-m-dithianone-(5'). The yield was 40% of theory.

*Example 44*

Using a procedure analogous to that described in Example 3, 6-morpholino-8-hydroxy-spiro(4H-m-dithiino[5,4 - d]pyrimidine - 2,3'-tetrahydrothiophene), M.P. 252–253° C. (recrystallized from dimethylformamide), of the formula

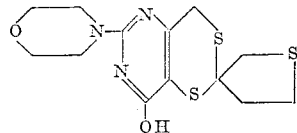

was prepared from N,N-diethyleneoxy-guanidine hydrochloride and spiro - (2',3 - tetrahydrothiophene)-4'carbethoxy-m-dithianone-(5'). The yield was 53% of theory.

*Example 45*

*Preparation of 6 - morpholino - 8 - pyrrolidino-4H-m-dithiino[5,4-d]pyrimidine by Method B.*—A mixture of 3.0 gm. (0.01 mol) of 6-ethylmercapto-8-pyrrolidino-4H-m-dithiino[5,4-d]pyrimidine and 50 cc. of morpholine was heated for 30 hours at 175° C. in a closed vessel. Thereafter, the mixture was allowed to cool and was then poured into water, whereby a crystalline precipitate formed. The precipitate was separated by vacuum filtration, washed with water and recrystallized from ethanol. 2.1 gm. (65% of theory) of a substance having a melting point of 145–146° C. were obtained. It was identified to be the compound of the formula

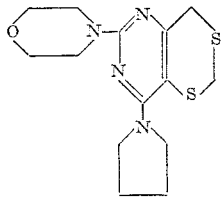

*Analysis.*—$C_{14}H_{20}N_4OS_2$; mol. wt. 324.47. Calculated: C, 51.82%; H, 6.21%; N, 17.27%. Found: C, 52.00%; H, 6.25%; N, 17.46%.

*Example 46*

*Preparation of 6-morpholino-8-hydroxy-4H-m-dithiino[5,4-d]pyrimidine by Method B.*—A mixture of 5 gm. (0.02 mol) of 6-ethylmercapto-8-hydroxy-4H-m-dithiino[5,4-d]pyrimidine and 50 cc. of morpholine was refluxed on an oil bath (bath temperature 140° C.) for eight hours, accompanied by stirring. Thereafter, the clear reaction mixture was allowed to cool and was then poured into 250 cc. of water. The crystalline precipitate formed thereby was separated by vacuum filtration, washed with water and recrystallized from dimethylformamide. 4.8 gm. (89% of theory) of 6-morpholino-8-hydroxy-4H-m-dithiino[5,4-d]pyrimidine having a melting point of 285° C. (decomp.) were obtained.

*Analysis.*—$C_{10}H_{13}N_3O_2S_2$: mol. wt. 271.37. Calculated: C, 44.26%; H, 4.83%; S, 23.63%. Found: C, 44.11%; H, 4.97%; S, 23.83%.

*Example 47*

Using a procedure analogous to that described in Example 46, 6-(2'-methyl-morpholino)-8-hydroxy-4H-m-dithiino[5,4-d]pyrimidine, M.P. 284–285° C. (recrystallized from dimethylformamide), of the formula

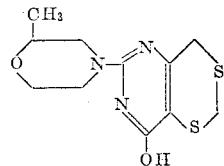

was prepared from 6-ethylmercapto-8-hydroxy-4H-m-dithiino[5,4-d]pyrimidine and 2-methyl-morpholine. The yield was 77% of theory.

*Example 48*

Using a procedure analogous to that described in Example 46, 2-phenyl-6-pyrrolidino-8-hydroxy-4H-m-dithiino[5,4-d]pyrimidine, M.P. 270° C. (recrystallized from methylglycol), of the formula

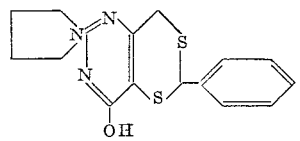

was prepared from 2-phenyl-6-ethylmercapto-8-hydroxy-4H-m-dithiino[5,4-d]pyrimidine and pyrrolidine. The yield was 61% of theory.

*Example 49*

Using a procedure analogous to that described in Example 46, 2-phenyl-6-morpholino-8-hydroxy-4H-m-dithiino[5,4-d]pyrimidine, M.P. 280° C. (recrystallized from methylglycol), was prepared from 2-phenyl-6-ethylmercapto-8-hydroxy-4H-m-dithiino[5,4-d]pyrimidine and morpholine. The yield was 65% of theory.

*Example 50*

*Preparation of 6-pyrrolidino - 8 - morpholino-4H-m-dithiino[5,4-d]pyrimidine by Method B.*—A mixture of 1 gm. (0.0034 mol) of 6-chloro-8-morpholino-4H-m-dithiino[5,4-d]pyrimidine and 15 cc. of pyrrolidine was refluxed for four hours. Thereafter, the clear reaction solution was allowed to cool and was then poured into 100 cc. of water. The crystalline precipitate formed thereby was separated by vacuum filtration, washed first with water and then with ethanol, and finally recrystallized from ethanol. 0.8 gm. (71% of theory) of a substance having a melting point of 133–134° C. was obtained, which was identified to be the compound of the formula

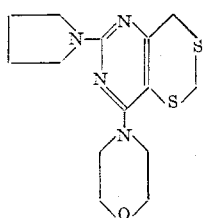

*Analysis.*—$C_{14}H_{20}N_4OS_2$; mol. wt. 324.47. Calculated: C, 51.82%; H, 6.21%; N, 17.27%. Found: C, 51.90%; H, 6.28%; N, 17.07%.

Example 51

*Preparation of 6-ethylmercapto-8-pyrrolidino-4H-m-dithiino[5,4-d]pyrimidine by Method B.*—1 gm. (0.0038 mol) of 6-ethylmercapto-8-chloro-4H-m-dithiino[5,4-d]pyrimidine was added to 2 cc. (0.024 mol) of pyrrolidine. A vigorous reaction took place, accompanied by reflux and formation of a solution. The reaction solution was allowed to stand at room temperature and without application of heat for one hour. The crystalline precipitate formed during that time was then separated by vacuum filtration, and the filter cake was recrystallized from ethanol. 0.8 gm. (70% of theory) of a substance having a melting point of 104–105° C. was obtained, which was identified to be the compound of the formula

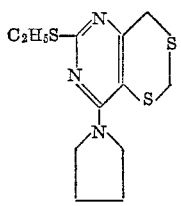

*Analysis.*—$C_{12}H_{17}N_3S_3$; mol. wt. 299.49. Calculated: C, 48.12%; H, 5.72%; S, 32.19%. Found: C, 48.20%; H, 5.83%; S, 31.90%.

Example 52

*Preparation of 6,8 - dimorpholino-4H-m-dithiino[5,4-d]pyrimidine by Method B.*—A mixture of 5.8 gm. (0.02 mol) of 6-morpholino-8-chloro-4H - m - dithiino[5,4 - d] pyrimidine and 15 cc. of morpholine was refluxed on an oil bath (bath temperature 150° C.) for three hours. Thereafter, the reaction mixture was allowed to cool, and then ether was added thereto. The precipitate formed thereby was separated by vacuum filtration, washed with water and recrystallized from ethanol. 5.4 gm. (79% of theory) of a substance having a melting point of 126° C. were obtained, which was identified to be the compound of the formula

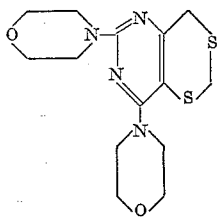

*Analysis.*—$C_{14}H_{20}N_4O_2S_2$; mol wt. 340.47. Calculated: C, 49.38%; H, 5.92%; N, 16.46%. Found: C, 49.30%; H, 6.04%; N, 16.56%.

Example 53

*Preparation of 6-morpholino - 8 - amino-4H-m-dithiino [5,4-d]pyrimidine by Method B.*—A mixture of 5.8 gm. (0.02 mol) of 6-morpholino-8 - chloro - 4H - m - dithiino [5,4-d]pyrimidine and 50 cc. of liquid ammonia was heated for five hours in a closed vessel on an oil bath (bath temperature 100° C.). Thereafter, the reaction mixture was allowed to cool to room temperature, and then the excess ammonia was allowed to escape from the vessel. The crystalline residue was stirred with water, the aqueous mixture was vacuum filtered, and the filter cake was recrystallized from ethanol. 4.1 gm. (76% of theory) of a substance having a melting point of 138–139° C. were obtained. It was identified to be the compound of the formula

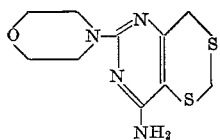

*Analysis.*—$C_{10}H_{14}N_4OS_2$; mol. wt. 270.39. Calculated: C, 44.42%; H, 5.22%; N, 20.72%. Found: C, 44.58%; H, 5.35%; N, 20.87%.

Example 54

*Preparation of 6 - morpholino-8-ethanolamino-4H-m-dithiino[5,4-d]pyrimidine by Method B.*—A mixture of 5.8 gm. (0.02 mol) of 6-morpholino-8-chloro-4H-m-dithiino[5,4-d]pyrimidine and 15 cc. of ethanolamine was heated for two hours on an oil bath (bath temperature 150° C.). Thereafter, the reaction solution was allowed to cool. The precipitate which crystallized out during that time was separated by vacuum filtration, washed first with ether and then with water, and recrystallized from ethanol. 3.5 gm. (58% of theory) of a substance having a melting point of 145–146° C. were obtained. It was identified to be the compound of the formula

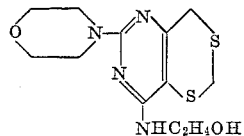

*Analysis.*—$C_{12}H_{18}N_4O_2S_2$; mol. wt. 314.44. Calculated: C, 45.84%; H, 5.77%; N, 17.82%. Found: C, 45.80%; H, 5.87%; N, 17.98%.

Example 55

*Preparation of 6-phenyl-8-morpholino-4H-m-dithiino-[5,4-d]pyrimidine by Method B.*—A mixture of 3.7 gm. (0.013 mol) of 6-phenyl-8-chloro-4H-m-dithiino[5,4-d]-pyrimidine and 10 cc. of morpholine was refluxed for 24 hours. Thereafter, the excess, unreacted morpholine was distilled off under reduced pressure, and the residue was taken up in 30 cc. of 2 N hydrochloric acid. The acid solution was then extracted twice with 25 cc.-portions of ether, and the aqueous phase was made alkaline with ammonia. The oily precipitate formed thereby was taken up in chloroform, and the resulting solution was washed with water and then dried over sodium sulfate. The chloroform was distilled off, leaving a viscous residue which crystallized throughout upon being scratched. The crystalline mass was vacuum filtered, and the filter cake was recrystallized twice from ethylacetate. 1.8 gm. (41% of theory) of a substance having a melting point of 103° C. were obtained. It was identified to be the compound of the formula

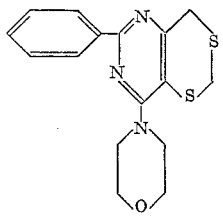

*Analysis.*—$C_{16}H_{17}N_3OS_2$; mol. wt. 331.47. Calculated: C, 57.97%; H, 5.17%; N, 12.68%. Found: C, 58.10%; H, 5.21%; N, 12.90%.

Example 56

*Preparation of 2-methyl-6-n-propyl-8-morpholino-4H-m-dithiino[5,4-d]pyrimidine and its maleate by Method B.*—A mixture of 8.4 gm. (0.0032 mol) of 2-methyl-6-n-propyl-8-chloro-4H-m-dithiino[5,4-d]pyrimidine and 20 cc. of morpholine was refluxed for 24 hours. Thereafter, the excess, unreacted morpholine was distilled off under reduced pressure, and then the semi-solid residue was acidified with 2 N hydrochloric acid. The acid solution was extracted twice with 20 cc.-portions of ether, and the aqueous phase was made alkaline with sodium hydroxide. The oily precipitate formed thereby was taken up in ether, and the resulting solution was washed with water and dried over sodium sulfate. The ether was evaporated, leaving 6.85 gm. of an oily residue, which was identified to be raw 2-methyl-6-n-propyl-8-morpholino-4H-m-dithiino[5,4-d]pyrimidine of the formula

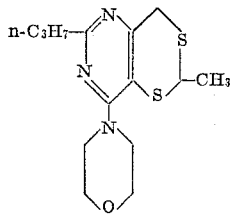

This oily residue was dissolved in a small amount of absolute ethanol, and the resulting solution was admixed with 22 cc. of a 1M ethanolic solution of maleic acid. The ethanol was then evaporated, leaving a crystalline residue which was recrystallized several times from absolute ethylacetate. 5 gm. (37% of theory) of the maleate of 2 - methyl-6-n-propyl-8-morpholino-4H-m-dithiino[5,4-d]pyrimindine were obtained. It had a melting point of 94–95° C.

Analysis.—$C_{18}H_{25}N_3O_5S_2$: mol. wt. 427.55. Calculated: C, 50.57%; H, 5.89%; N, 9.83%; S, 15.00%. Found: C, 50.40%; H, 5.97%; N, 9.54%; S, 14.70%.

*Example 57*

Using a procedure analogous to that described in Exampl 54, 6-morpholino-8-(2'-methyl-morpholino)-4H-m-dithiino[5,4-d]pyrimidine, M.P. 108–109° C. (recrystallized from ethanol), was prepared from 6-morpholino-8-chloro-4H-m-dithiino[5,4-d]pyrimidine and 2 - methyl - morpholine. The yield was 64% of theory.

*Example 58*

Using a procedure analogous to that described in Example 54, 6-morpholino-8-(4'-methyl-piperazino)-4H-m-dithiino[5,4-d]pyrimidine, M.P. 124–125° C. (recrystalized from ethanol), of the formula

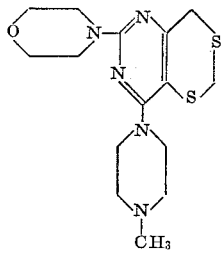

was prepared from 6-morpholino-8-chloro-4H-m-dithiino-[5,4-d]pyrimidine and N-methyl-piperazine. The yield was 59% of theory.

*Example 59*

Using a procedure analogous to that described in Example 54, 6-morpholino-8-piperidino-4H-m-dithiino[5,4-d]pyrimidine, M.P. 115–116° C. (recrystallized from ethanol), of the formula

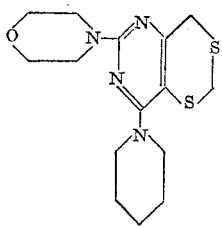

was prepared from 6-morpholino-8-chloro-4H-m-dithiino-[5,4-d]pyrimidine and piperidine. The yield was 72% of theory.

*Example 60*

Using a procedure analogous to that described in Example 54, 6-morpholino-8-pyrrolidino-4H-m-dithiino[5,4-d]pyrimidine, M.P. 145–146° C. (recrystallized from ethanol). was prepared from 6-morpholino-8-chloro-4H-m-dithiino[5,4-d]pyrimidine and pyrrolidine. The yield was 61% of theory.

*Example 61*

Using a procedure analogous to that described in Example 52, 6-(2'-methyl-morpholino)-8-morpholino-4H-m-dithiino[5,4-d]pyrimidine, M.P. 117–118° C. (recrystallized from acetone), was prepared from 6-(2'-methyl-morpholino) - 8-chloro-4H-m-dithiino[5,4-d]pyrimidine and morpholine. The yield was 52% of theory.

*Example 62*

Using a procedure analogous to that described in Example 52, 6-pyrrolidino-8-morpholino-4H-m-dithiino[5,4-d]pyrimidine, M.P. 133–134° C. (recrystallized from acetone), was prepared from 6-pyrrolidino-8-chloro-4H-m-dithiino[5,4-d]pyrimidine and morpholine. The yield was 73% of theory.

*Example 63*

Using a procedure analogous to that described in Example 52, 6-pyrrolidino-8-(2'-methyl-morpholino)-4H-m-dithiino[5,4-d]pyrimidine, M.P. 88–89° C. (recrystallized from acetone), was prepared from 6-pyrrolidino-8-chloro-4H-m-dithiino[5,4-d]pyrimidine and 2-methyl-morpholine. The yield was 57% of theory.

*Example 64*

Using a procedure analogous to that described in Example 52, 6-pyrrolidino-8-(4'-methyl-piperazino)-4H-m-dithiino[5,4-d]pyrimidine, M.P. 93–94° C. (recrystallized from acetone), was prepared from 6-pyrrolidino-8-chloro-4H-m-dithiino[5,4-d]pyrimidine and N-methyl-piperazine. The yield was 48% of theory.

*Example 65*

Using a procedure analogous to that described in Example 54, 6-morpholino-8-cyclohexylamino-4H-m-dithiino[5,4-d]pyrimidine, M.P. 128–129° C. (recrystallized from ethanol), of the formula

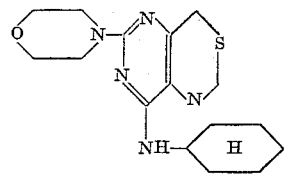

was prepared from 6-morpholino-8-chloro-4H-m-dithiino [5,4-d]pyrimidine and cyclohexylamine. The yield was 50% of theory.

*Example 66*

Using a procedure analogous to that described in Example 54, 6-morpholino-8-anilino-4H-m-dithiino[5,4-d] pyrimidine, M.P. 189–190° C. (recrystallized from butanol), of the formula was prepared from 6-morpholino-8-chloro-4H-m-dithiino [5,4-d]pyrimidine and aniline. The yield was 69% of theory.

Example 67

Using a procedure analogous to that described in Example 54, 6-morpholino-8-benzylamino-4H-m-dithiino[5,4-d]pyrimidine, M.P. 170–171° C. (recrystallized from dimethylformamide), of the formula

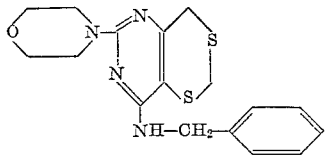

was prepared from 6-morpholino-8-chloro-4H-m-dithiino[5,4-d]pyrimidine and benzylamine. The yield was 64% of theory.

Example 68

Using a procedure analogous to that described in Example 53, 6-morpholino-8-ethylamino-4H-m-dithiino[5,4-d]pyrimidine, M.P. 91–92° C. (recrystallized from ethanol), of the formula

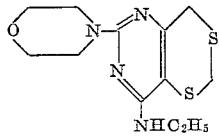

was prepared from 6-morpholino-8-chloro-4H-m-dithiino[5,4-d]pyrimidine and ethylamine. The yield was 47% of theory.

Example 69

Using a procedure analogous to that described in Example 54, 6-morpholino-8-n-propylamino-4H-m-dithiino[5,4-d]pyrimidine, M.P. 92–93° C. (recrystallized from ethanol), of the formula

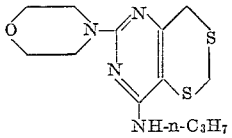

was prepared from 6-morpholino-8-chloro-4H-m-dithiino[5,4-d]pyrimidine and n-propylamine. The yield was 70% of theory.

Example 70

Using a procedure analogous to that described in Example 52, 6-morpholino-8-n-butylamino-4H-m-dithiino[5,4-d]pyrimidine, M.P. 68–69° C. (recrystallized from petroleum ether), was prepared from 6-morpholino-8-chloro - 4H - m - dithiino[5,4-d]pyrimidine and n-butylamine. The yield was 50% of theory.

Example 71

Using a procedure analogous to that described in Example 53, 6-(2'-methyl-morpholino)-8-amino-4H-m-dithiino[5,4-d]pyrimidine, M.P. 136–137° C. (recrystallized from ethanol), was prepared from 6-(2'-methyl-morpholino) - 8 - chloro-4H-m-dithiino[5,4-d]pyrimidine and ammonia. The yield was 63% of theory.

Example 72

Using a procedure analogous to that described in Example 53, 6-pyrrolidino-8-amino-4H-m-dithiino[5,4-d]pyrimidine, M.P. 206–207° C. (recrystallized from butanol), was prepared from 6-pyrrolidino-8-chloro-4H-m-dithiino[5,4-d]pyrimidine and ammonia. The yield was 81% of theory.

Example 73

Using a procedure analogous to that described in Example 52, 6-pyrrolidino-8-n-propylamino-4H-m-dithiino[5,4-d]pyrimidine, M.P. 59–60° C. (recrystallized from ethanol), was prepared from 6-pyrrolidino-8-chloro-4H-m-dithiino[5,4-d]pyrimidine and n-propylamine. The yield was 43% of theory.

Example 74

Using a procedure analogous to that described in Example 54, 6-morpholino-8-isobutylamino-4H-m-dithiino[5,4-d]pyrimidine, M.P. 124–125° C. (recrystallized from methanol), was prepared from 6-morpholino-8-chloro - 4H - m - dithiino[5,4-d]pyrimidine and isobutylamine. The yield was 46% of theory.

Example 75

Using a procedure analogous to that described in Example 52, 6-morpholino-8-isoamylamino-4H-m-dithiino[5,4-d]pyrimidine, M.P. 93–94° C. (recrystallized from ethanol), was prepared from 6-morpholino-8-chloro - 4H - m - dithiino[5,4-d]pyrimidine and isoamylamine. The yield was 52% of theory.

Example 76

Using a procedure analogous to that described in Example 52, 6-(2'-methyl-morpholino) - 8 - isopropylamino-4H-m-dithiino[5,4-d]pyrimidine, M.P. 100–101° C. (recrystallized from ethanol), was prepared from 6-(2' - methyl-morpholino)-8-chloro-4H-m-dithiino[5,4-d]pyrimidine and isopropylamine. The yield was 43% of theory.

Example 77

Using a procedure analogous to that described in Example 52, 6-pyrrolidino-8-isopropylamino-4H-m-dithiino[5,4-d]pyrimidine, M.P. 89–90° C. (recrystallized from ethanol), was prepared from 6-pyrrolidino-8-chloro-4H - m - dithiino[5,4-d]pyrimidine and isopropylamine. The yield was 67% of theory.

Example 78

Using a procedure analogous to that described in Example 52, 6-pyrrolidino-8-isobutylamino-4H-m-dithiino[5,4-d]pyrimidine, M.P. 108–109° C. (recrystallized from ethanol), was prepared from 6-pyrrolidino-8-chloro-4H-m-dithiino[5,4-d]pyrimidine and isobutylamine. The yield was 76% of theory.

Example 79

Using a procedure analogous to that described in Example 54, 6-morpholino-8-allylamino-4H-m-dithiino[5,4-d]pyrimidine, M.P. 99–100° C. (recrystallized from ethanol), of the formula

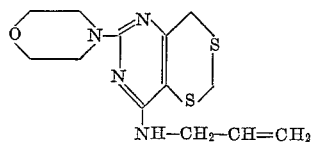

was prepared from 6-morpholino-8-chloro-4H-m-dithiino[5,4-d]pyrimidine and allylamine. The yield was 55% of theory.

Example 80

Using a procedure analogous to that described in Example 54, 6-pyrrolidino-8-allylamino-4H-m-dithiino[5,4-d]pyrimidine, M.P. 100–101° C. (recrystallized from ethanol), was prepared from 6-pyrrolidino-8-chloro-4H-m-dithiino[5,4-d]pyrimidine and allylamine. The yield was 63% of theory.

Example 81

Using a procedure analogous to that described in Example 53, 6-morpholino-8-dimethylamino-4H-m-dithiino[5,4-d]pyrimidine, M.P. 115–116° C. (recrystallized from ethanol), of the formula

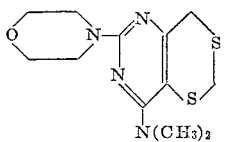

was prepared from 6-morpholino-8-chloro-4H-m-dithiino [5,4-d]pyrimidine and dimethylamine. The yield was 74% of theory.

*Example 82*

Using a procedure analogous to that described in Example 53, 6-(2'-methyl-morpholino)-8-diethylamino-4H-m-dithiino[5,4-d]pyrimidine, M.P. 91–92° C. (recrystallized from ethanol), was prepared from 6-(2'-methyl-morpholino)-8-chloro - 4H - m - dithiino[5,4-d] pyrimidine and diethylamine. The yield was 49% of theory.

*Example 83*

Using a procedure analogous to that described in Example 53, 6-pyrrolidino-8-diethylamino-4H-m-dithiino [5,4-d]pyrimidine, M.P. 81–82° C. (recrystallized from ethanol), was prepared from 6-pyrrolidino-8-chloro-4H-m-dithiino[5,4-d]pyrimidine and diethylamine. The yield was 58% of theory.

*Example 84*

Using a procedure analogous to that described in Example 54, 6-morpholino-8-(diallylamino)-4H-m-dithiino[5,4-d]pyrimidine, M.P. 73–74° C. (recrystallized from methanol), of the formula

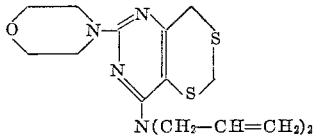

was prepared from 6-morpholino-8-chloro-4H-m-dithiino[5,4-d]pyrimidine and diallylamine. The yield was 56% of theory.

*Example 85*

Using a procedure analogous to that described in Example 54, 6-morpholino-8-(diethanolamino)-4H-m-dithiino[5,4-d]pyrimidine, M.P. 152–153° C. (recrystallized from ethanol), of the formula

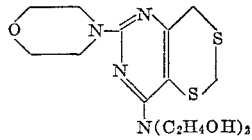

was prepared from 6-morphilino-8-chloro-4H-m-dithiino-[5,4-d]pyrimidine and diethanolamine. The yield was 41% of theory.

*Example 86*

Using a procedure analogous to that described in Example 54, 6-morpholino-8-(N-methyl-ethanolamino)-4H-m-dithiino[5,4-d]pyrimidine, M.P. 124–125° C. (recrystallized from methanol), of the formula

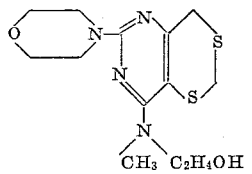

was prepared from 6-morpholino-8-chloro-4H-m-dithiino-[5,4-d]pyrimidine and N - methyl - ethanolamine. The yield was 64% of theory.

*Example 87*

Using a procedure analogous to that described in Example 54, 6-morpholino-8-(3'-methoxy-n-propyl-amino) 4H-m-dithiino[5,4-d]pyrimidine, M.P. 94–95° C. (recrystallized from methanol), of the formula

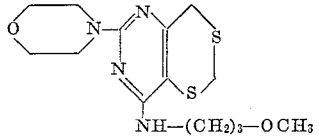

was prepared from 6-morpholino-8-chloro-4H-m-dithiino [5,4-d]pyrimidine and 3-methoxy-n-propyl-amine. The yield was 38% of theory.

*Example 88*

Using a procedure analogous to that described in Example 54, 6-morpholino-8-(2'-morpholinoethyl - amino) 4H-m-dithiino[5,4-d]pyrimidine, M.P. 134–136° C. (recrystallized from ethanol), of the formula

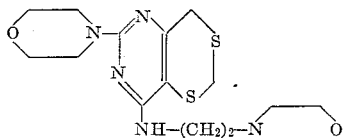

was prepared from 6-morpholino-8-chloro-4H-m-dithiino [5,4-d]pyrimidine and 2'-morpholinoethyl-amine. The yield was 57% of theory.

*Example 89*

Using a procedure analogous to that described in Example 55, 6-methyl-8-n-hexylamino-4H-m-dithiino[5,4-d] pyrimidine, M.P. 57° C. (recrystallized from petroleum ether), was prepared from 6-methyl-8-chloro-4H-m-dithiino[5,4-d]pyrimidine and n-hexylamine. The yield was 48% of theory.

*Example 90*

Using a procedure analogous to that described in Example 55, 6 - methyl-8-pyrrolidino-4H-m-dithiino[5,4-d] pyrimidine, M.P. 131° C. (recrystallized from ethylacetate), was prepared from 6-methyl-8-chloro-4H-m-dithiino[5,4-d]pyrimidine and pyrrolidine. The yield was 37% of theory.

*Example 91*

Using a procedure analogous to that described in Example 55, 6 - methyl-8-morpholino-4H-m-dithiino[5,4-d] pyrimidine, M.P. 142–143° C. (recrystallized from ethylacetate), was prepared from 6-methyl-8-chloro-4H-m-dithiino[5,4-d]pyrimidine and morpholine. The yield was 40% of theory.

*Example 92*

Using a procedure analogous to that described in Example 55, 6-n-propyl-8-morpholino-4H-m-dithiino[5,4-d] pyrimidine, M.P. 74° C. (recrystallized from petroleum ether), was prepared from 6-n-propyl-8-chloro-4H-m-dithiino[5,4-d]pyrimidine and morpholine. The yield was 42% of theory.

*Example 93*

Using a procedure analogous to that described in Example 55, 6-isopropyl-8-morpholino-4H-m-dithino[5,4-d] pyrimidine, M.P. 61° C. (recrystallized from petroleum ether), was prepared from 6-isopropyl-8-chloro-4H-m-dithiino[5,4-d]pyrimidine and morpholine. The yield was 58% of theory.

*Example 94*

Using a procedure analogous to that described in Example 52, 2-methyl-6,8-dimorpholino-4H-m-dithiino[5,4-d]pyrimidine, M.P. 147–148° C. (recrystallized from ethanol), was prepared from 2-methyl-6-morpholino-8-chloro-4H-m-dithiino[5,4-d]pyrimidine and morpholine. The yield was 70% of theory.

Example 95

Using a procedure analogous to that described in Example 55, 2,6-dimethyl-8-morpholino-4H-m-dithiino[5,4-d]pyrimidine, M.P. 128° C. (recrystallized from ethylacetate), was prepared from 2,6-dimethyl-8-chloro-4H-m-dithiino[5,4-d]pyrimidine and morpholine. The yield was 32% of theory.

Example 96

Using a procedure analogous to that described in Example 55, 2-methyl-6-ethyl-8-pyrrolidino-4H-m-dithiino[5,4-d]pyrimidine, M.P. 57–58° C. (recrystallized from petroleum ether), of the formula

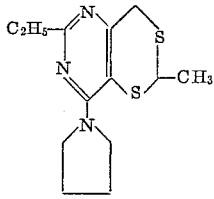

was prepared from 2-methyl-6-ethyl-8-chloro-4H-m-dithiino[5,4-d]pyrimidine and pyrrolidine. The yield was 46% of theory.

Example 97

Using a procedure analogous to that described in Example 55, 2-methyl-6-ethyl-8-morpholino-4H-m-dithiino[5,4-d]pyrimidine, M.P. 63° C. (recrystallized from petroleum ether), was prepared from 2-methyl-6-ethyl-8-chloro-4H-m-dithiino[5,4-d]pyrimidine and morpholine. The yield was 37% of theory.

Example 98

Using a procedure analogous to that described in Example 52, 2-methyl-6-pyrrolidino-8-morpholino-4H-m-dithiino[5,4-d]pyrimidine, M.P. 110–111° C. (recrystallized from petroleum ether), was prepared from 2-methyl-6-pyrrolidino-8-chloro-4H-m-dithiino[5,4-d]pyrimidine and morpholine. The yield was 70% of theory.

Example 99

Using a procedure analogous to that described in Example 52, 2-phenyl-6-pyrrolidino-8-morpholino-4H-m-dithiino[5,4-d]pyrimidine, M.P. 133–134° C. (recrystallized from ethanol), of the formula

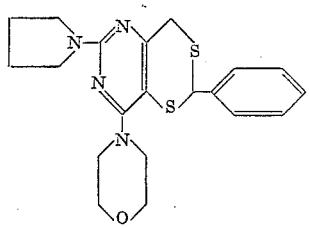

was prepared from 2-phenyl-6-pyrrolidino-8-chloro-4H-m-dithiino[5,4-d]pyrimidine and morpholine. The yield was 48% of theory.

Example 100

Using a procedure analogous to that described in Example 52, 2-phenyl-6,8-dimorpholino-4H-m-dithiino[5,4-d]pyrimidine, M.P. 128° C. (recrystallized from ethanol), was prepared from 2-phenyl-6-morpholino-8-chloro-4H-m-dithiino[5,4-d]pyrimidine and morpholine. The yield was 73% of theory.

Example 101

Using a procedure analogous to that described in Example 55, 2-phenyl-6-methyl-8-morpholino-4H-m-dithiino[5,4-d]pyrimidine, M.P. 111–112° C. (recrystallized from petroleum ether), was prepared from 2-phenyl-6-methyl-8-chloro-4H-m-dithiino[5,4-d]pyrimidine and morpholine. The yield was 50% of theory.

Example 102

Using a procedure analogous to that described in Example 56, 6-ethyl-8-morpholino-4H-m-dithiino[5,4-d]pyrimidine maleate, M.P. 122° C. (recrystallized from ethylacetate), was prepared from 6-ethyl-8-chloro-4H-m-dithiino[5,4-d]pyrimidine, morpholine and maleic acid. The yield was 56% of theory.

Example 103

Using a procedure analogous to that described in Example 55, 6-n-propyl-8-pyrrolidino-4H-m-dithiino[5,4-d]pyrimidine, M.P. 67–68° C. (recrystallized from ethylacetate), was prepared from 6-n-propyl-8-chloro-4H-m-dithiino[5,4-d]pyrimidine and pyrrolidine. The yield was 62% of theory.

Example 104

Using a procedure analogous to that described in Example 55, 6-n-propyl-8-piperidino-4H-m-dithiino[5,4-d]pyrimidine, M.P. 61–62° C. (recrystallized from ethylacetate), of the formula

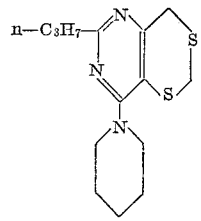

was prepared from 6-n-propyl-8-chloro-4H-m-dithiino[5,4-d]pyrimidine and piperidine. The yield was 53% of theory.

Example 105

Using a procedure analogous to that described in Example 56, 6-benzyl-8-morpholino-4H-m-dithiino[5,4-d]pyrimidine hydrochloride, M.P. 213° C. (recrystallized from ethanol), was prepared from 6-benzyl-8-chloro-4H-m-dithiino[5,4-d]pyrimidine, morpholine and hydrochloric acid. The yield was 77% of theory.

Example 106

Using a procedure analogous to that described in Example 55, 2-phenyl-6-isopropyl-8-morpholino-4H-m-dithiino[5,4-d]pyrimidine, M.P. 138–139° C. (recrystallized from ethylacetate), was prepared from 2-phenyl-6-isopropyl-8-chloro-4H-m-dithiino[5,4-d]pyrimidine and morpholine. The yield was 64% of theory.

Example 107

Using a procedure analogous to that described in Example 53, 6,8-diamino-4H-m-dithiino[5,4-d]pyrimidine, M.P. above 320° C. (recrystallized from dimethylformamide), of the formula

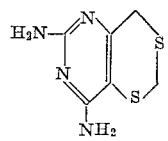

was prepared from 6-amino-8-chloro-4H-m-dithiino[5,4-d]pyrimidine and ammonia. The yield was 37% of theory.

Example 108

Using a procedure analogous to that described in Example 53, 6-amino-8-morpholino-4H-m-dithiino[5,4-d]pyrimidine, M.P. 130–131.5° C. (recrystallized from ethanol), was prepared from 6-chloro-8-morpholino-4H-m-dithiino[5,4-d]pyrimidine and ammonia. The yield was 35% of theory.

Example 109

Preparation of 6-morpholino-8-methoxy-4H-m-dithiino[5,4-d]pyrimidine by Method B.—5.8 gm. (0.02 mol)

of 6-morpholino-8-chloro-4H-m-dithiino[5,4-d]pyrimidine were added to a solution of 0.5 gm. (0.022 gm.-atoms) of sodium in 100 cc. of absolute methanol, and the resulting mixture was refluxed for two hours. Thereafter, the reaction solution was allowed to cool. The precipitate formed thereby was separated by vacuum filtration, washed with water and recrystallized from methanol. 3.7 gm. (64% of theory) of the compound of the formula

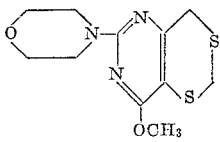

were obtained. It had a melting point of 140–141° C.
*Analysis.*—$C_{11}H_{15}N_3O_2S_2$: mol. wt. 285.40. Calculated: C, 46.29%; H, 5.30%; N, 14.73%. Found: C, 46.40%; H, 5.36%; N, 14.62%.

*Example 110*

Using a procedure analogous to that described in Example 109, 6-morpholino-8-ethoxy-4H-m-dithiino[5,4-d]pyrimidine, M.P. 122–123° C. (recrystallized from acetone), was prepared from 6-morpholino-8-chloro-4H-m-dithiino[5,4-d]pyrimidine and sodium ethylate. The yield was 53% of theory.

*Example 111*

Using a procedure analogous to that described in Example 109, 6-morpholino-8-n-propoxy-4H-m-dithiino[5,4-d]pyrimidine, M.P. 139° C. (recrystallized from acetone), was prepared from 6-morpholino-8-chloro-4H-dithiino[5,4-d]pyrimidine and sodium propylate. The yield was 71% of theory.

*Example 112*

Using a procedure analogous to that described in Example 109, 6-morpholino-8-allyloxy-4H-m-dithiino[5,4-d]pyrimidine, M.P. 143–144° C. (recrystallized from acetone), of the formula

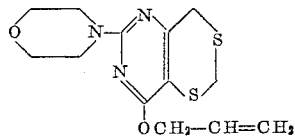

was prepared from 6-morpholino-8-chloro-4H-m-dithiino[5,4-d]pyrimidine and sodium allylate. The yield was 67% of theory.

*Example 113*

Using a procedure analogous to that described in Example 109, 6-pyrrolidino-8-ethoxy-4H-m-dithiino[5,4-d]pyrimidine, M.P. 91–92° C. (recrystallized from acetone), was prepared from 6-pyrrolidino-8-chloro-4H-m-dithiino[5,4-d]pyrimidine and sodium ethylate. The yield was 84% of theory.

*Example 114*

Using a procedure analogous to that described in Example 109, 6-pyrrolidino-8-isopropoxy-4H-m-dithiino[5,4-d]pyrimidine, M.P. 127–128° C. (recrystallized from acetone), was prepared from 6-pyrrolidino-8-chloro-4H-m-dithiino[5,4-d]pyrimidine and sodium isopropylate. The yield was 59% of theory.

*Example 115*

*Preparation of 6-(2'-methyl-morpholino)-8-ethylamino-4H-m-dithiino[5,4-d]pyrimidine hydrochloride from the free base.*—3.1 gm. (0.01 mol) of 6-(2'methyl-morpholino)-8-ethylamino-4H-m-dithiino[5,4-d]pyrimidine were dissolved in 100 cc. of absolute ethylacetate, and the resulting solution was admixed with ethereal hydrochloric acid until it was acid to Congo Red. The precipitate formed thereby was separated by vacuum filtration, washed with absolute ethyl acetate and recrystallized from absolute ethanol. 2.4 gm. (69% of theory) of the hydrochloride of 6-(2'methyl-morpholino)-8-ethyl-amino-4H-m-dithiino[5,4-d]pyrimidine, M.P. 217–218° C., were obtained.
*Analysis.*—$C_{13}H_{21}ClN_4OS_2$: mol. wt. 348.93. Calculated: C, 44.75%; H, 6.07%; Cl, 10.16%. Found: C, 44.65%; H, 6.05%; Cl, 10.25%.

*Example 116*

Using a procedure analogous to that described in Example 2, 2-o-chlorophenyl-6-n-propyl-8-hydroxy-4H-m-dithiino[5,4-d]pyrimidine, M.P. 230–232° C. (recrystallized from methylglycol), of the formula

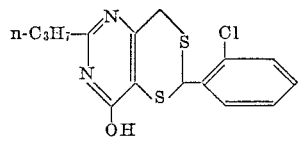

was prepared from n-butyramidine hydrochloride and 2-o-chlorophenyl-4-carbethoxy-m-dithianone-(5). The yield was 59% of theory.

*Example 117*

Using a procedure analogous to that described in Example 2, 2-n-propyl-6-methyl-8-hydroxy-4H-m-dithiino[5,4-d]pyrimidine, M.P. 204–206° C. (recrystallized from ethanol), was prepared from acetamidine hydrochloride and 2-n-propyl-4-carbethoxy-m-dithianone-(5). The yield was 72% of theory.

*Example 118*

Using a procedure analogous to that described in Example 2, 2-n-propyl-6-ethyl-8-hydroxy-4H-m-dithiino[5,4-d]pyrimidine, M.P. 181–183° C. (recrystallized from ethanol), was prepared from propionamidine hydrochloride and 2-n-propyl-4-carbethoxy-m-dithianone-(5). The yield was 70% of theory.

*Example 119*

Using a procedure analogous to that described in Example 2, 2,6-di-(n-propyl)-8-hydroxy-4H-m-dithiino[5,4-d]pyrimidine, M.P. 171–173° C. (recrystallized from ethanol), was prepared from n-butyramidine hydrochloride and 2-n-propyl-4-carbethoxy-m-dithianone-(5). The yield was 70% of theory.

*Example 120*

Using a procedure analogous to that described in Example 3, 2-n-propyl-6-morpholino-8-hydroxy-4H-m-dithiino[5,4-d]pyrimidine, M.P. 232° C. (recrystallized from methyl-glycol), was prepared from N,N-diethyleneoxy-guanidine hydrochloride and 2-n-propyl-4-carbethoxy-m-dithianone-(5). The yield was 40% of theory.

*Example 121*

Using a procedure analogous to that described in Example 2, 2,2,6-trimethyl-8-hydroxy-4H-m-dithiino[5,4-d]pyrimidine, M.P. 254–257° C. (recrystallized from methyl-glycol), of the formula

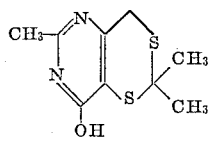

was prepared from acetamidine hydrochloride and 2,2-dimethyl-4-carbethoxy-m-dithianone-(5). The yield was 68% of theory.

*Example 122*

Using a procedure analogous to that described in Example 2, 2,2-dimethyl-6-ethyl-8-hydroxy-4H-m-dithiino[5,4-d]pyrimidine, M.P. 227–230° C. (recrystallized from ethanol), was prepared from propionamidine hydrochloride and 2,2-dimethyl-4-carbethoxy-m-dithianone-(5). The yield was 60% of theory.

Example 123

Using a procedure analogous to that described in Example 2, 6'-ethyl-8'-hydroxy-spiro[cyclohexane 1,2'-(4H-m-dithiino[5,4-d]pyrimidine)], M.P. 230–233° C. (recrystallized from ethanol), of the formula

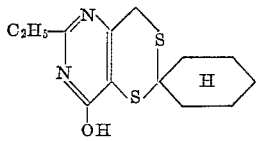

was prepared from propionamidine hydrochloride and spiro-cyclohexane-1',2-[4-carbethoxy-m-dithianone - (5)]. The yield was 60% of theory.

Example 124

Using a procedure analogous to that described in Example 3, 6-dimethylamino-8-hydroxy-4H-m-dithiino[5,4-d] pyrimidine, M.P. 285–288° C. (recrystallized from dimethylformamide), of the formula

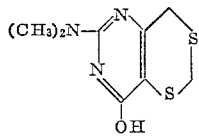

was prepared from N,N-dimethyl-guanidine hydrochloride and 4-carbethoxy-m-dithianone-(5). The yield was 35% of theory.

Example 125

Using a procedure analogous to that described in Example 55, 2-n-propyl-6-methyl-8-pyrrolidino-4H-m-dithiino[5,4-d]pyrimidine, M.P. 82–84° C. (recrystallized from acetone), was prepared from 2-n-propyl-6-methyl-8-chloro-4H-m-dithiino[5,5-d]pyrimidine and pyrrolidine. The yield was 50% of theory.

Example 126

Using a procedure analogous to that described in Example 55, 2-n-propyl-6-methyl-8-morpholino-4H-m-dithiino[5,4-d]pyrimidine, M.P. 87–89° C. (recrystallized from acetone), was prepared from 2-n-propyl-6-methyl-8-chloro-4H-m-dithiino[5,4-d]pyrimidine and morpholine. The yield was 45% of theory.

Example 127

Using a procedure analogous to that described in Example 55, 2,2,6-trimethyl-8-pyrrolidino-4H-m-dithiino[5,4-d]pyrimidine, M.P. 112–114° C. (recrystallized from petroleum ether), was prepared from 2,2,6-trimethyl-8-chloro-4H-m-dithiino[5,4-d]pyrimidine and pyrrolidine. The yield was 57% of theory.

Example 128

Using a procedure analogous to that described in Example 55, 2,2,6 - trimethyl-8-morpholino-4H-m-dithiino-[5,4-d]pyrimidine, M.P. 104° C. (recrystallized from acetone), was prepared from 2,2,6-trimethyl-8-chloro-4H-m-dithiino[5,4-d]pyrimidine and morpholine. The yield was 52% of theory.

Example 129

Using a procedure analogous to that described in Example 55, 2,2-dimethyl-6-ethyl-8-pyrrolidino-4H-m-dithiino[5,4-d]pyrimidine, M.P. 115–117° C. (recrystallized from methanol), was prepared from 2,2-dimethyl-6-ethyl-8-chloro-4H-m-dithiino[5,4-d]pyrimidine and pyrrolidine. The yield was 58% of theory.

Example 130

Using a procedure analogous to that described in Example 55, 2,2-dimethyl-6-ethyl-8-morpholino-4H-m-dithiino[5,4-d]pyrimidine, M.P. 81–83° C. (recrystallized from acetone), was prepared from 2,2-dimethyl-6-ethyl-8-chloro-4H-m-dithiino[5,4-d]pyrimidine and morpholine. The yield was 35% of theory.

Example 131

Using a procedure analogous to that described in Example 56, 2,2-dimethyl-6-n-propyl-8-morpholino-4H-m-dithiino[5,4-d]pyrimidine maleate, M.P. 100–101° C. (recrystallized from ethylacetate), was prepared from 2,2-dimethyl - 6 - n-propyl-8-chloro-4H-m-dithiino[5,4-d]pyrimidine, morpholine and maleic acid. The yield was 64% of theory.

Example 132

Using a procedure analogous to that described in Example 55, 6'-methyl-8'-pyrrolidino-spiro[cyclohexane-1,2'-(4H-m-dithiino[5,4-d]pyrimidine)], M.P. 90° C. (recrystallized from acetone), of the formula

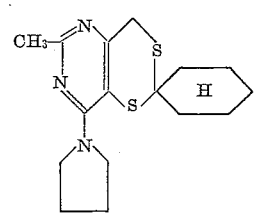

was prepared from 6'-methyl-8'-chloro-spiro[cyclohexane-1,2'-(4H-m-dithiino[5,4-d]pyrimidine)] and pyrrolidine. The yield was 38% of theory.

Example 133

Using a procedure analogous to that described in Example 55, 6'-methyl-8'-morpholino-spiro[cyclohexane-1,2'-(4H-m-dithiino[5,4-d]pyrimidine)], M.P. 88–91° C. (recrystallized from petroleum ether), of the formula

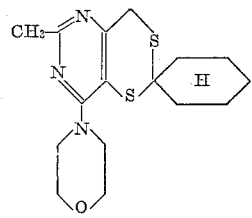

was prepared from 6'-methyl-8'-chloro-spiro[cyclohexane-1,2'-(4H-m-dithiino[5,4-d]pyrimidine)] and morpholine. The yield was 41% of theory.

The compounds according to the present invention, that is, those embraced by Formula I above, their non-toxic, pharmacologically acceptable acid addition salts and their alkali metal salts, have useful pharmacodynamic properties. More particularly, they exhibit sedative, analgesic, antiphlogistic, antipyretic and cardiovascular activities. In addition, they are useful as intermediates in the preparation of pesticidal compounds.

For pharmaceutical purposes, the compounds of the present invention are administered topically, parenterally or orally as active ingredients in customary dosage unit compositions, that is, in compositions in dosage unit form consisting essentially of an inert pharmaceutical carrier having uniformly distributed therein one dosage unit of the active ingredient, such as tablets, pills, solutions, suspensions, suppositories and the like. One dosage unit of the compounds of the present invention is from 10 to 200 mgm., preferably 25–50 mgm.

The following examples illustrate a few dosage unit compositions comprising a compound of the present invention as an active ingredient. The parts are parts by weight unless otherwise specified.

Example 134

*Coated pills.*—The pill cores are compounded from the following ingredients:

| | Parts |
|---|---|
| 6-pyrrolidino-8-morpholino-4H-m-dithiino[5,4-d]pyrimidine | 25.0 |
| Calcium phosphate, secondary | 75.0 |
| Corn starch | 21.0 |
| Gelatin | 4.0 |
| Talcum | 4.0 |
| Magnesium stearate | 1.0 |
| Total | 130.0 |

*Compounding procedure.*—The dithiinopyrimidine compound, the calcium phosphate and the corn starch are admixed with each other, the mixture is moistened with an aqueous 14% solution of the gelatin, the moist mixture is forced through a 1.5 mm.-mesh screen, and the resulting granulate is dried at 40° C. The dry granulate is forced through a 1.0 mm.-mesh screen, admixed with the talcum and the magnesium stearate, and the mixture is pressed into 130 mgm.-pill cores. The pill cores are then coated with a thin shell consisting essentially of talcum and sugar, and the coated pills are polished with beeswax. Each pill weighs about 200 mgm. and contains 25 mgm. of the active ingredient.

Example 135

*Hypodermic solution.*—The solution is compounded from the following ingredients:

| | Parts |
|---|---|
| 6-pyrrolidino-8-(4'-methyl-piperazino)-4H-m-dithiino[5,4-d]pyrimidine | 10.0 |
| Tartaric acid | 10.0 |
| Polyethyleneglycol 600 | 100.0 |
| Distilled water q.s. ad | [1] 2000.0 |

[1] By volume.

*Compounding procedure.*—The polyethyleneglycol is melted and is admixed with about twice its volume of distilled water. The mixture is heated to 80° C., and then the tartaric acid and the dithiino pyrimidine compound are successively dissolved therein. The solution is allowed to cool to room temperature, is diluted with additional distilled water to the desired volume, and is finally filtered until free from suspended particles. The filtered solution is filled into brown 2 cc.-ampules which are then sterilized for thirty minutes at 100° C. and sealed. Each ampule contains 10.0 mgm. of the active ingredient.

Example 136

*Drop solution.*—The solution is compounded from the following ingredients:

| | Parts |
|---|---|
| 6-pyrrolidino-8-diethylamino-4H-m-dithiino[5,4-d]pyrimidine | 10.0 |
| Tartaric acid | 10.0 |
| Cane sugar | 350.0 |
| Sorbic acid | 1.0 |
| Essence of cocoa | 50.0 |
| Ethanol | [1] 200.0 |
| Polyethyleneglycol 600 | [1] 100.0 |
| Distilled water q.s. ad | [1] 1000.0 |

[1] By volume.

*Compounding procedure.*—The sorbic acid is dissolved in the ethanol, an equal amount of water is added, and then the tartaric acid and the dithiino pyrimidine compound are dissolved therein while stirring (Solution A). The cane sugar is dissolved in the remaining amount of distilled water (Solution B). Solution B, the polyethyleneglycol and the essence of cocoa are added to Solution A while stirring, and the finished solution is filtered. Each cc. of the solution (about five drops) contains 10 mgm. of the active ingredient.

Example 137

*Tablets.*—The tablet composition is compounded from the following ingredients:

| | Parts |
|---|---|
| 2-methyl-6-n-propyl-8-morpholino-4 H - m - dithiino[5,4-d]pyrimidine | 50.0 |
| Lactose | 80.0 |
| Potato starch, dry | 16.0 |
| Polyvinylpyrrolidone | 10.0 |
| Potato starch, undried | 10.0 |
| Colloidal silicic acid | 2.0 |
| Magnesium stearate | 2.0 |
| Total | 170.0 |

*Compounding procedure.*—The dithiinopyrimidine compound, the lactose and the dry potato starch are admixed with each other, the mixture is moistened with an aqueous 20% solution of the polyvinylpyrrolidone, and the moist mixture is granulated by passing it through a 1.5 mm.-mesh screen. The granulate is dried at 40° C., again passed through the screen, and admixed with the remaining ingredients. The resulting mixture is pressed into 170 mgm.-tablets. Each tablet contains 50.0 mgm. of the active ingredient.

Example 138

*Suppositories.*—The suppository composition is compounded from the following ingredients:

| | Parts |
|---|---|
| 2-methyl-6-ethyl-8-morpholino-4H-m-dithiino[5,4-d]pyrimidine | 200.0 |
| Cocoa butter | 1550.0 |
| Total | 1750.0 |

*Compounding procedure.*—The cocoa butter is melted and cooled to 37° C., the finely pulverized dithiinopyrimidine compound is stirred in, and the resulting suspension is homogenized and then poured into cooled suppository molds, each holding 1750 mgm. of the suspension. Each suppository contains 200 mgm. of the active ingredient.

Example 139

*Gelatin capsules.*—The capsule filling is compounded from the following ingredients:

| | Parts |
|---|---|
| 2-isopropyl-6-methyl-8-hydroxy-4H-m-dithiino[5,4-d]pyrimidine | 20.0 |
| Lactose | 60.0 |
| Talcum | 20.0 |
| Total | 100.0 |

*Compounding procedure.*—The individual ingredients are intimately admixed with each other, the mixture is passed through a 1.0 mm.-mesh screen, and the screened mixture is filled into gelatin capsules, each holding 100 mgm. of the mixture. Each capsule contains 20 mgm. of the active ingredient.

Although the above dosage unit composition examples illustrate only a few of the dithiino[5,4-d]pyrimidines of the present invention as active ingredients, it should be understood that any of the other compounds embraced by Formula I or their non-toxic acid addition salts or their alkali metal salts may be substituted for the illustrated active ingredient species in Examples 134–139. Similarly, the amount of active ingredient may be varied within the dosage unit limits set forth above, and the nature and amounts of the inert adjuvants may be varied to meet particular requirements.

While the present invention has been illustrated with the aid of certain specific embodiments thereof, it will be readily apparent to others skilled in the art that the invention is not limited to those specific embodiments and that various changes and modifications may be made

We claim:
1. A compound selected from the group consisting of 4H-m-dithiino[5,4-d]pyrimidine substitution products of the formula

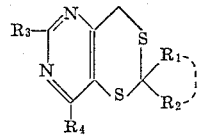

wherein $R_1$ and $R_2$ are each selected from the group consisting of hydrogen, lower alkyl, phenyl, halophenyl, benzyl and, together with each other and the carbon atom to which they are attached, a spirocyclic ring of a formula selected from the group consisting of

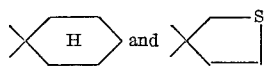

$R_3$ is selected from the group consisting of hydrogen, lower alkyl, lower alkoxy, phenyl, benzyl and

wherein $R_5$ and $R_6$, together with each other and the adjacent nitrogen atom, form a basic heterocyclic ring selected from the group consisting of pyrrolidino, morpholino and lower alkyl-morpholino, and
$R_4$ is selected from the group consisting of hydroxy, lower alkoxy, lower alkenoxy and

wherein $R_7$ and $R_8$ are each selected from the group consisting of hydrogen, lower alkyl, lower alkenyl, hydroxy-lower alkyl, lower alkoxy-lower alkyl, morpholino-lower alkyl, phenyl, benzyl, cyclohexyl and, together with each other and the adjacent nitrogen atom, a basic heterocyclic ring selected from the group consisting of pyrrolidino, morpholino, piperidino, lower alkyl-morpholino and N'-lower alkyl-piperazino, and their non-toxic, pharmacologically acceptable acid addition salts.

2. A compound selected from the group consisting of 4H-m-dithiino[5,4-d]pyrimidine substitution products of the formula

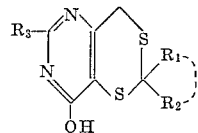

wherein $R_1$ and $R_2$ are each selected from the group consisting of hydrogen, lower alkyl, phenyl, halophenyl, benzyl and, together with each other and the carbon atom to which they are attached, a spirocyclic ring of a formula selected from the group consisting of

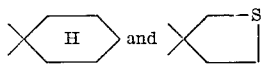

$R_3$ is selected from the group consisting of hydrogen, lower alkyl, lower alkoxy, phenyl, benzyl and

wherein $R_5$ and $R_6$, together with each other and the adjacent nitrogen atom, form a basic heterocyclic ring selected from the group consisting of pyrrolidino, morpholino and lower alkyl-morpholino,
and their non-toxic, pharmacologically acceptable acid addition salts.

3. A compound selected from the group consisting of 4H-m-dithiino[5,4-d]pyrimidine substitution products of the formula

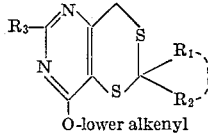 or 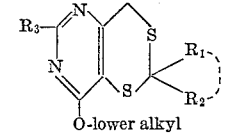

wherein $R_1$ and $R_2$ are each selected from the group consisting of hydrogen, lower alkyl, phenyl, halophenyl, benzyl and, together with each other and the carbon atom to which they are attached, a spirocyclic ring of a formula selected from the group consisting of

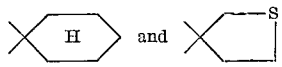

$R_3$ is selected from the group consisting of hydrogen, lower alkyl, lower alkoxy, phenyl, benzyl and

wherein $R_5$ and $R_6$, together with each other and the adjacent nitrogen atom, form a basic heterocyclic ring selected from the group consisting of pyrrolidino, morpholino and lower alkyl-morpholino,
and their non-toxic, pharmacologically acceptable acid addition salts.

4. A compound selected from the group consisting of 4H-m-dithiino[5,4-d]pyrimidine substitution products of the formula

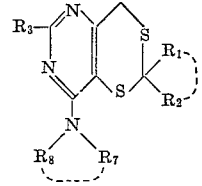

wherein $R_1$ and $R_2$ are each selected from the group consisting of hydrogen, lower alkyl, phenyl, halophenyl, benzyl and, together with each other and the carbon atom to which they are attached, a spirocyclic ring of a formula selected from the group consisting of

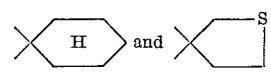

$R_3$ is selected from the group consisting of hydrogen, lower alkyl, lower alkoxy, phenyl, benzyl and

wherein $R_5$ and $R_6$, together with each other and the adjacent nitrogen atom, form a basic heterocyclic ring selected from the group consisting of pyrrolidino, morpholino and lower alkyl-morpholino, and
$R_7$ and $R_8$ are each selected from the group consisting of hydrogen, lower alkyl, lower alkenyl, hydroxy-lower alkyl, lower alkoxy-lower alkyl, morpholino-lower alkyl, phenyl, benzyl, cyclohexy and, together with each other and the adjacent nitrogen atom, a basic heterocyclic ring selected from the group consisting of pyrrolidino, morpholino, piperidino, lower alkyl-morpholino and N'-lower alkyl-piperazino,
and their non-toxic, pharmacologically acceptable acid addition salts.

5. 6,8-dimorpholino-4H-m-dithiino[5,4-d]pyrimidine.

6. 6 - pyrrolidino - 8-morpholino-4H-m-dithiino[5,4-d]pyrimidine.

7. 6 - pyrrolidino - 8-(4-methylpiperazino)-4H-m-dithiino[5,4-d]pyrimidine.

8. 6 - pyrrolidino-8-diethylamino-4H-m-dithiino[5,4-d]pyrimidine.

9. 6 - n - propyl-8-morpholino-4H-m-dithiino[5,4-d]pyrimidine.

10. 2 - methyl - 6-n-propyl-8-morpholino-4H-m-dithiino[5,4-d]pyrimidine.

11. 2 - methyl - 6-ethyl-8-morpholino-4H-m-dithiino[5,4-d]pyrimidine.

12. 2 - i - propyl-6-methyl-8-hydroxy-4H-m-dithiino[5,4-d]pyrimidine.

13. 2 - n - propyl-6-morpholino-8-hydroxy-4H-m-dithiino[5,4-d]pyrimidine.

References Cited by the Examiner

UNITED STATES PATENTS

| 1,915,334 | 6/1933 | Salzberg et al. | 260—243 |
| 2,075,359 | 3/1937 | Salzberg et al. | 167—22 |
| 2,362,614 | 11/1944 | Calva | 167—22 |
| 2,979,504 | 4/1961 | Smith | 260—247.1 |
| 3,039,927 | 6/1962 | Lafon | 167—65 |
| 3,039,930 | 6/1962 | Gray | 167—65 |

OTHER REFERENCES

Howard et al.: "J.A.C.S.," vol. 82, pp. 158–64 (1960).

WALTER A. MODANCE, *Primary Examiner.*

R. T. BOND, *Assistant Examiner.*